(12) United States Patent
Fujimori et al.

(10) Patent No.: US 6,536,906 B2
(45) Date of Patent: Mar. 25, 2003

(54) PROJECTOR

(75) Inventors: Motoyuki Fujimori, Suwa (JP);
Takeshi Takezawa, Matsumoto (JP);
Hisamaro Kato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/983,800

(22) Filed: Oct. 25, 2001

(65) Prior Publication Data

US 2002/0057419 A1 May 16, 2002

(30) Foreign Application Priority Data

Nov. 1, 2000 (JP) ........................................ 2000-334628

(51) Int. Cl.[7] .............................................. G03B 21/14
(52) U.S. Cl. .......................................... 353/119; 353/31
(58) Field of Search ............................. 353/31, 33, 34, 353/81, 119, 121; 349/58

(56) References Cited

U.S. PATENT DOCUMENTS 6,010,221 A * 1/2000 Maki et al. .................... 353/33
6,053,616 A * 4/2000 Fujimori et al. ............. 353/119
6,322,217 B1 * 11/2001 Fujimori et al. .............. 353/31
2002/0015119 A1 * 2/2002 Takizawa ..................... 349/58

* cited by examiner

Primary Examiner—William Dowling
(74) Attorney, Agent, or Firm—Oliff & Berridge, PLC

(57) ABSTRACT

The present invention provides a technology for mounting a prism which is used for a projector, such as a crossed dichroic prism, accurately in a predetermined position of a base frame. A projector for displaying color images can include an illumination optical system, a colored-light-separating optical system for separating light emitted from the illumination optical system into first, second, and third colored light which are three color components, first, second, and third electro-optical devices which modulate the first, second, and third colored light, respectively, according to image data, and produce first, second, and third modulated light, respectively. The projector can further include a colored-light-combining optical system for combining the first, second, and third modulated light, a projection optical system for projecting the combined light emitted from the colored-light-combining optical system, and a base frame for mounting a plurality of optical parts which are disposed in a light path between the illumination optical system and the projection optical system. The colored-light-combining optical system can be a crossed dichroic prism bonded directly to the base frame.

17 Claims, 15 Drawing Sheets

(A)

(B)

(A)

(B)

(A)

(B)

(A)

(B)

(C)

(A)

(B)

(C)

PROJECTOR

BACKGROUND OF THE INVENTION

1. Field of Invention

The present invention relates to projectors capable of displaying images.

2. Description of the Related Art

Currently a projector displays images in such a way that light emitted from an illumination optical system is modulated according to image data (image signals) by liquid crystal light valves, for example, and the modulated light is projected onto a screen. The projector for displaying color images is provided with a colored-light-separating optical system for separating light emitted from the illumination optical system into three colored light and a colored-light-combining optical system for combining three modulated light emitted from respective three liquid crystal light valves. A crossed dichroic prism is used as the colored-light-combining system, the crossed dichroic prism being provided with the two types of selection films formed at a substantially X-shaped interface between four rectangular prisms. The projector can include a plurality of optical parts assembled with each other. The plurality of optical parts are generally mounted onto a common base frame.

SUMMARY OF THE INVENTION

With the above described projector, it has been difficult to mount the crossed dichroic prism accurately in a predetermined position of the base frame. Accordingly, the present invention provides a technology for accurately mounting a prism such as a crossed dichroic prism used for a projector to a predetermined position of a base frame, thereby solving the above-described problems found with respect to the conventional technology.

In order to solve at least one part of the above-described problem, a first device according to the present invention, which is a projector for displaying color images, can include an illumination optical system, a colored-light-separating optical system for separating light emitted from the illumination optical system into first, second, and third colored light which are three color components, respectively, first, second, and third electro-optical devices which modulate the first, second, and third colored light, respectively, according to image data, and produce first, second, and third modulated light, respectively, and a colored-light-combining optical system for combining the first, second, and third modulated light. The projector can further include a projection optical system for projecting the combined light emitted from the colored-light-combining optical system, and a base frame for mounting a plurality of optical parts which are disposed in a light path extending from the illumination optical system to the projection optical system. Furthermore, at least one of the colored-light-separating optical system and the colored-light-combining optical system can be provided with a prism that includes a selection film formed therein for selecting light having a predetermined range of wavelengths, and the prism is bonded directly to the base frame.

In the first device, since the prism is directly bonded to the base frame, the prism can be mounted accurately to a predetermined position on the base frame in comparison with a case that the prism is bonded to the base frame with screws. The prism may be a colored-light-combining prism which forms the colored-light-combining optical system.

The colored-light-combining prism may comprise, for example, four columnar prisms sectioned by a substantially X-shaped interface and the two types of selection films formed at the substantially X-shaped interface.

In the above device, the colored-light-combining prism is preferably bonded to the base frame with an ultraviolet-curing resin. When an ultraviolet-curing resin is used as described above, the colored-light-combining prism and the base frame can easily be bonded to each other in a relatively short time.

A mark is preferably provided in the vicinity of a substantially square region of the base frame to which the colored-light-combining prism having a substantially cubic shape is bonded, the mark indicating a position of mounting the colored-light-combining prism. The mark may be, for example, a hole or a concavity provided in the center of the substantially square region to which the colored-light-combining prism is bonded. With this arrangement, the colored-light-combining prism can easily be mounted in a predetermined position of the base frame.

In the above device, the base frame preferably comprises a metal material at least in the region to which the colored-light-combining prism is bonded. With this arrangement, temperature rise of the colored-light-combining prism can be suppressed.

In the above device, the first, second, and third electro-optical devices may be three liquid crystal panels, and three liquid crystal light valves which include the three liquid crystal panels, respectively, may be bonded to the colored-light-combining prism. In the above device, the liquid crystal light valves are respectively provided with a polarizing plate disposed at a light-emitting face of the liquid crystal panel and a light transmissive substrate with the polarizing plate bonded thereto and having a heat conductivity of not less than approximately 5 W/m•K, and each light transmissive substrate is preferably bonded to the colored-light-combining prism. The light transmissive substrate may be made of quartz or sapphire.

When such light transmissive substrates are used, temperature rise due to heat generation in the polarizing plates provided at the light-emitting faces of the liquid crystal panels can be suppressed.

In the above device, the liquid crystal light valves may be respectively provided with a polarizing plate disposed at a light-emitting face of the liquid crystal panel and bonded to the colored-light-combining prism, and the four columnar prisms of the colored-light-combining prism may include a light transmissive material having a heat conductivity of not less than approximately 5 W/m•K. The light transmissive material may be quartz or sapphire.

When the colored-light-combining prism includes such a light transmissive material, temperature rise due to heat generation in the polarizing plates disposed at the light-emitting faces of the liquid crystal panels can be suppressed. Moreover, there is an advantage that the light transmissive substrates to which the polarizing plates are bonded can be omitted.

The above device may further include three lenses disposed in the vicinities of light-incident faces of the three liquid crystal light valves, respectively. The three lenses may be mounted to a holding frame, which differs from the base frame, and be fixed to the base frame. With this arrangement, the three lenses can easily be mounted to the base frame. For example, when the liquid crystal light valves are bonded to the colored-light-combining prism after the colored-light-combining prism is mounted to the base frame, a workspace for the operation can be ensured.

A second device according to the present invention, which is a projector for displaying color images, can include an illumination optical system, a colored-light-separating optical system for separating light emitted from the illumination optical system into first, second, and third colored light which are three color components, respectively, first, second, and third electro-optical devices which modulate the first, second, and third colored light, respectively, according to image data, and produce first, second, and third modulated light, respectively, and a colored-light-combining optical system for combining the first, second, and third modulated light. The projector that displays color images can further include a projection optical system for projecting the combined light emitted from the colored-light-combining optical system, and a base frame for mounting a plurality of optical parts which are disposed in a light path extending from the illumination optical system to the projection optical system. At least one of the colored-light-separating optical system and the colored-light-combining optical system can be provided with a prism which includes a selection film formed therein for selecting light having a predetermined range of wavelengths. Furthermore, a detachable mounting platform for mounting the prism can be fixed to the base frame, and the prism is bonded to the mounting platform fixed to the base frame.

Since the prism is bonded to the mounting platform fixed to the base frame in the second device, the prism can be mounted accurately in a predetermined position of the base frame in the same manner as in the first device.

In the above device, a mark is preferably provided in the vicinity of a substantially square region of the base frame to which the colored-light-combining prism having a substantially cubic shape is bonded, the mark indicating a position of mounting the colored-light-combining prism. The mounting platform is preferably provided with a hole formed therein through which the mark formed on the base frame can be confirmed from the upper side of the mounting platform. With this arrangement, the prism can easily be disposed in a predetermined position of the base frame when the mounting platform is detachable.

A method for fixing a prism, which includes a selection film formed therein for selecting light having a predetermined range of wavelengths and is included in at least one of a colored-light-separating optical system and a colored-light-combining optical system, to a base frame of a projector for displaying color images. The projector can include an illumination optical system, the colored-light separating-optical system for separating light emitted from the illumination optical system into first, second, and third colored light which are three color components, respectively, first, second, and third electro-optical devices which modulate the first, second, and third colored light, respectively, according to image data, and produce first, second, and third modulated light, respectively, the colored-light-combining optical system for combining the first, second, and third modulated light; a projection optical system for projecting the combined light emitted from the colored-light-combining optical system, and the base frame for mounting a plurality of optical parts which are disposed in a light path extending from the illumination optical system to the projection optical system. The method can include the steps of fixing a detachable mounting platform for mounting the prism to the base frame, and bonding the prism to the mounting platform fixed to the base frame.

When the prism is fixed to the base frame in the above-described steps, the prism can easily be disposed in a predetermined position of the base frame when the mounting platform is detachable.

BRIEF DESCRIPTION OF THE DRAWINGS

The invention will be described with reference to the accompanying drawings, in which like elements are referred to with like numbers, and wherein.

DETAILED DESCRIPTION OF PREFERRED EMBODIMENTS

Figure 1:
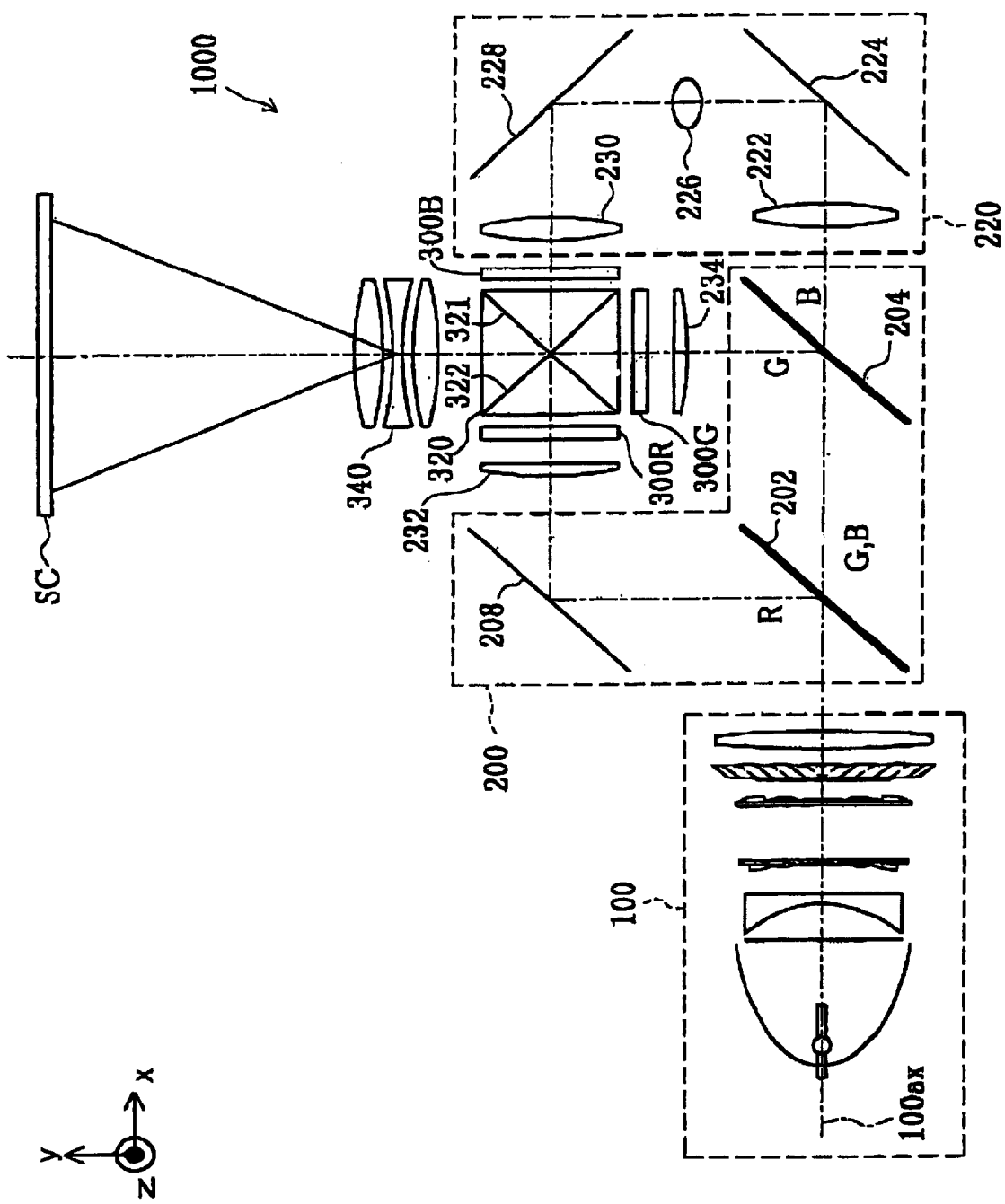
FIG. 1 is a schematic diagram of a projector according to the present invention.

An embodiment according to the present invention is described below. FIG. 1 is a schematic view of a projector according to a first embodiment. A projector 1000 can include an illumination optical system 100, a colored-light-separating optical system 200, a relay optical system 220, three liquid crystal light valves 300R, 300G, and 300B, a crossed dichroic prism 320, and a projection optical system 340.

Light emitted from the illumination optical system 100 is separated by the colored-light-separating optical system 200 into three colored light which are red (R), green (G), and blue (B). Each separated colored light is modulated by liquid crystal light valve 300R, 300G, or 300B according to image data. The light modulated by the liquid crystal light valves 300R, 300G, and 300B according to image data is combined by the crossed dichroic prism 320, and is projected onto a screen SC by the projection optical system 340. Thus, images are displayed on the screen SC.

Figure 2:
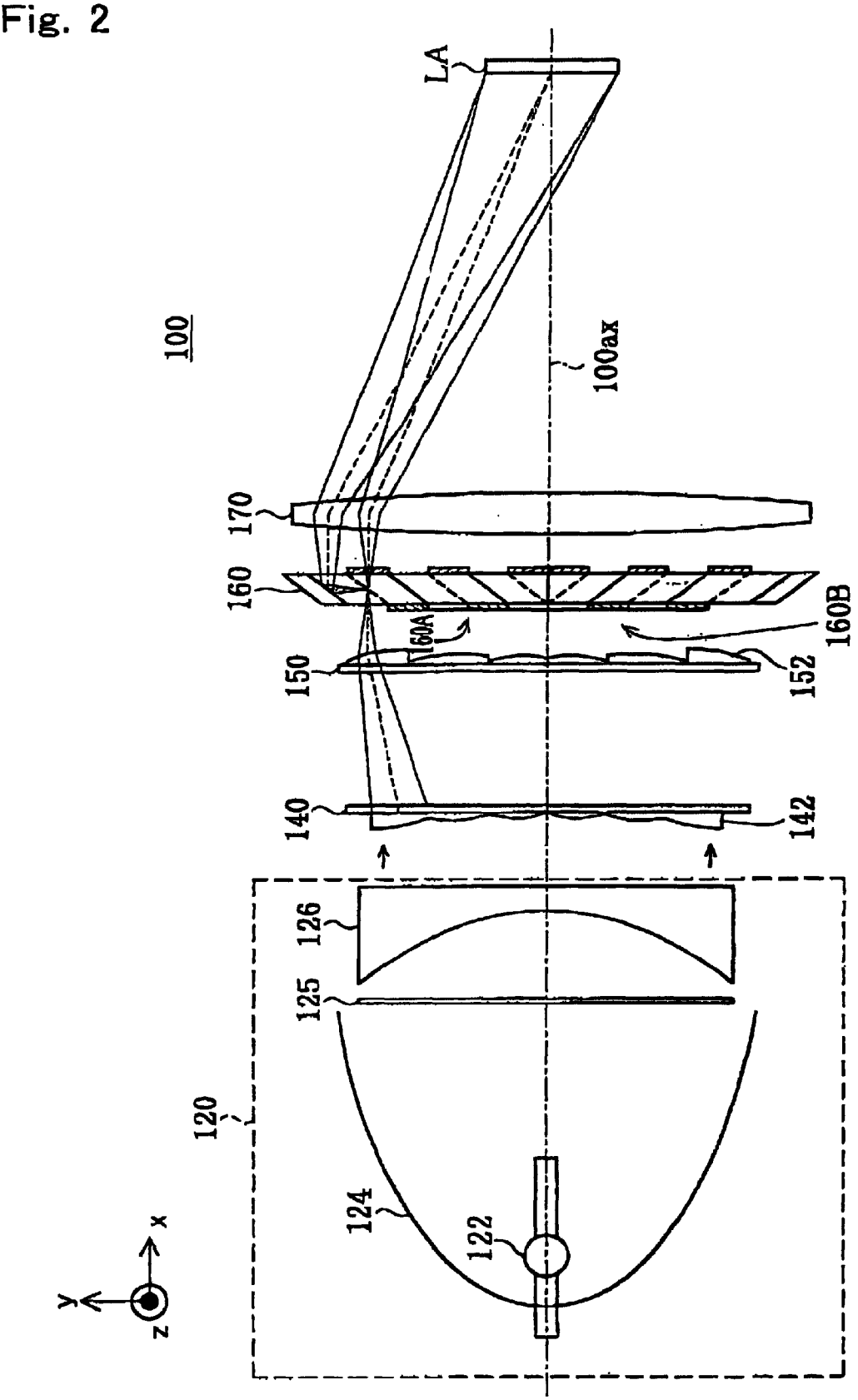
FIG. 2 is an expanded diagram of an illumination optical system 100 shown in FIG. 1.

FIG. 2 is an expanded view illustrating optical system 100 shown in FIG. 1. The illumination optical system 100 can include a light source unit 120, first and second lens arrays 140 and 150, a polarizing optical system 160, and a superimposing lens 170. These optical parts are disposed with respect to a system optical axis 100ax as a reference. The system optical axis 100ax is a central axis of a light beam emitted from the light source unit 120. In FIG. 2, an illumination region LA illuminated by the illumination optical system 100 corresponds to the liquid crystal light valve 300R, 300G, or 300B shown in FIG. 1.

The light source unit 120 includes a lamp 122, a reflector 124 having a spheroidal concave surface, and a collimating lens 126. The lamp 122 is disposed in the vicinity of a first focal point of the spheroidal surface of the reflector 124. Light emitted from the lamp 122 reflects at the reflector 124. The reflected light is led toward a second focal point of the reflector 124 while being condensed. The collimating lens 126 converts the condensed light incident thereto into light substantially parallel to the system optical axis 100ax.

The light source unit 120 further includes an ultraviolet-removing filter 125 disposed at the light-incident side of the collimating lens 126. The ultraviolet-removing filter 125 removes ultraviolet light from the light that is emitted from the lamp 122 of the light source unit 120, whereby degradation of optical parts including organic materials (for example, polarizing plates included in the liquid crystal light valves) due to ultraviolet can be suppressed.

The first lens array 140 includes a plurality of small lenses 142 arrayed in a matrix, and the second lens array 150 includes a plurality of small lenses 152 arrayed in a matrix. The first lens array 140 separates a substantially parallel light flux emitted from the light source unit 120 into a plurality of light flux segments and emits the light flux segments. The second lens array 150 collimates central axes of the light flux segments emitted by the first lens array 140 with respect to the system optical axis 100ax. The second lens array 150 forms images on the illumination region LA with images from the small lenses 142 of the first lens array 140 in cooperation with the superimposing lens 170.

Each of the small lenses 142 and 152 is a plano-convex decentered lens and is set to have an outline substantially similar to that of the illumination region LA (liquid crystal light valve) when viewed in an x-direction. Decentered lenses, which are decentered in manners differing from each other, are used on the first small lens 142 and the second small lens 152, as shown in FIG. 2. The outermost small lenses 142 of the first lens array 140 are decentered so that major light beams of the separated light flux segments travel obliquely with respect to the system optical axis 100ax. The outermost small lenses 152 of the second lens array 150 are decentered so that the major light beams of the light flux segments obliquely incident on the system optical axis 100ax travel substantially in parallel to the system optical axis 100ax.

The small lenses 152 of the second lens array 150 condense the light flux segments emitted through the small lenses 142 of the first lens array 140 into the vicinity of the small lenses 152, that is, in the polarizing optical system 160, as shown in FIG. 2.

The polarizing optical system 160 includes two polarization element arrays 160A and 160B that are integrated with each other. The first and second polarization element arrays 160A and 160B are disposed symmetrical with each other with respect to the system optical axis 100ax.

Figure 3:
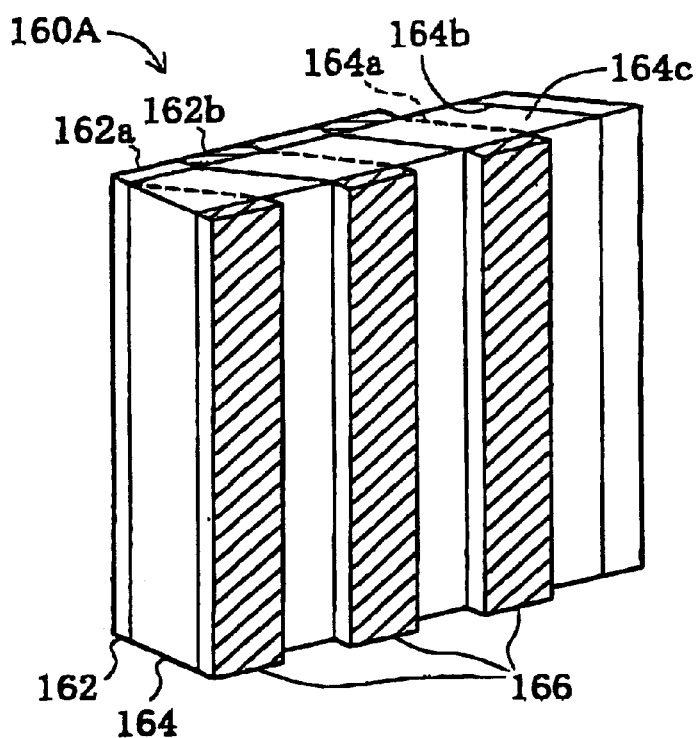
FIGS. 3 (A)–(B) are expanded illustrations of a first polarization element array 160A shown in FIG. 2.
Figure 3:
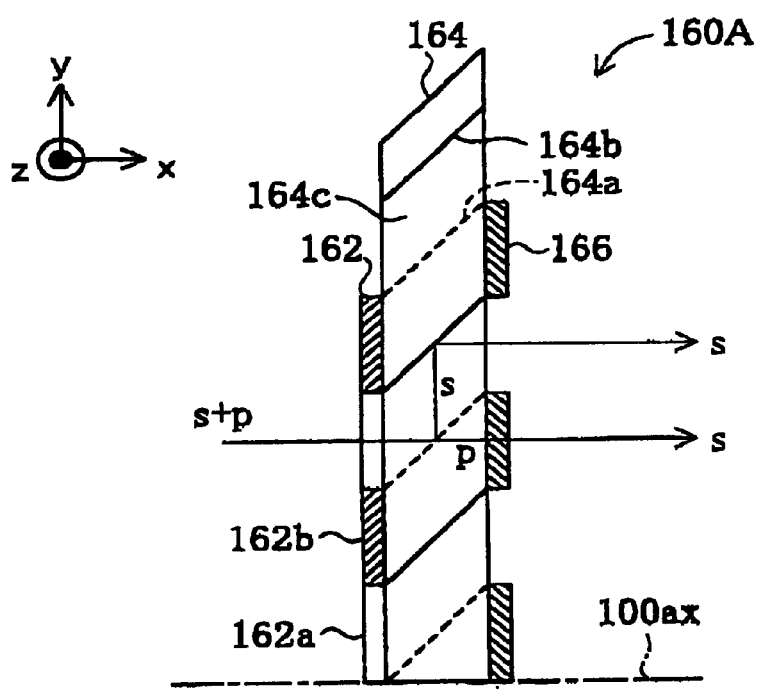

FIG. 3 is an expanded view of the first polarization element array 160A shown in FIG. 2. FIG. 3(A) is a perspective view of the first polarization element array 160A. FIG. 3(B) is a plan view in the +z-direction of the first polarization element array 160A. The polarization element array 160A includes a light-shielding plate 162, a polarized-beam splitter array 164, and a plurality of $\lambda/2$-retarders 166 selectively disposed on the light-emitting surface of the polarized-beam splitter array 164. The second polarization element array 160B has the same configuration.

In FIGS. 3(A) and 3(B), the polarized-beam splitter array 164 is formed with a plurality of columnar glass members 164c each having a substantially parallelogrammic section bonded to each other. Polarized-light-separating films 164a and reflecting films 164b are alternately formed at interfaces between glass members 164c.

The light-shielding plate 162 is provided with open faces 162a and light-shielding faces 162b alternately disposed in a striped pattern. The open faces 162a and the light-shielding faces 162b are disposed associating with the polarized-light-separating films 164a and the reflecting films 164b, respectively. With this arrangement, the light flux segments emitted through the first lens array 140 (see FIG. 2) are applied only to the polarized-light-separating films 164a of the polarized-beam splitter array 164 via the open faces 162a and are not applied to the reflecting films 164b.

Major light beams (central axes) of the light flux segments emitted through the first lens array 140 (see FIG. 2) are applied to the open faces 162a of the light-shielding plate 162 in parallel to the system optical axis 100ax, as shown by solid lines in FIG. 3(B). The light flux segments passing through the open faces 162a are separated into the light flux segments polarized in a direction s and the light flux segments polarized in a direction p. The light flux segments polarized in the direction p pass through the polarized-light-separating films 164a and are emitted from the polarized-beam splitter array 164. The light flux segments polarized in the direction s are reflected by the polarized-light-separating films 164a and by the reflecting films 164b, and are emitted from the polarized-beam splitter array 164. The light flux segments polarized in the direction p and the light flux segments polarized in the direction s are parallel to each other at a light-emitting surface of the polarized-beam splitter array 164.

The $\lambda/2$-retarders 166 are formed only in portions of the polarized-beam splitter array 164, from which the light flux segments polarized in the direction p which have passed through the polarized-light-separating films 164a are emitted. The $\lambda/2$-retarders 166 convert incident linearly polarized beams into beams linearly polarized in a direction perpendicular to the incident linearly polarized beams. Therefore, the light flux segments polarized in the direction p are converted into the light flux segments polarized in the direction s and are emitted by the $\lambda/2$-retarders 166. With this arrangement, the light flux segments (s+p) before polarization incident to the polarization element array 160A are converted into the light flux segments polarized in the direction s and are emitted.

As described above, each of a plurality of the light flux segments emitted from the first lens array 140 is separated into two light flux segments and are converted into substantially one type of beam linearly polarized in the same direction by the polarizing optical system 160. A plurality of the light flux segments polarized in the same direction are superimposed at the illumination region LA by the superimposing lens 170 shown in FIG. 2. In this case, the luminous intensity is substantially evenly distributed over the illumination region LA.

As described above, the illumination optical system 100 (see FIG. 1) emits an illumination light polarized in the same direction (s-direction-polarized beam) and illuminates the liquid crystal light valves 300R, 300G, and 300B via the colored-light-separating optical system 200 and the relay optical system 220.

The colored-light-separating optical system 200 (see FIG. 1) includes two dichroic mirrors 202 and 204 and a reflective mirror 208. The colored-light-separating optical system 200 separates light emitted from the illumination optical system 100 into three colored light which are red (R), green (G), and blue (B). The first dichroic mirror 202 reflects a red component and transmits blue and green components of the light emitted from the illumination optical system 100. A red light R reflected at the first dichroic mirror 202 is reflected by the reflective mirror 208 and is applied to the liquid crystal light valve 300R for red light via a field lens 232. The field lens 232 converts the light flux segments emitted from the illumination optical system 100 into light fluxes parallel to the system optical axis 100ax. Field lenses 234 and 230, which are disposed at the light-incident sides of the liquid crystal light valves 300G and 300B, respectively, have the same function as that of the filed lens 232.

The blue and green light components transmitted by the first dichroic mirror 202 are separated by the second dichroic mirror 204. A green light G is reflected at the second dichroic mirror 204 and is applied to the liquid crystal light valve 300G for green light via the field lens 234. A blue light B is applied to the relay optical system 220 after transmitted by the second dichroic mirror 204.

The blue light B incident to the relay optical system 220 is applied to the liquid crystal light valve 300B for blue via an incident-side lens 222, a first reflective mirror 224, a relay lens 226, a second reflective mirror 228, and an emitting-side lens (the field lens) 230 which are provided in the relay optical system 220. The relay optical system 220 is used as a light path of the blue light B because the light path for the blue light B is longer than those for the other colored light R and G. By using the relay optical system 220, the blue light B incident to the incident-side lens 222 can be transmitted, as it is, to the emitting-side lens 230.

The three liquid crystal light valves 300R, 300G, and 300B produce modulated light by modulating the incident three colored-light, respectively, according to given image data (image signals). Each liquid crystal light valve generally includes a liquid crystal panel which corresponds to an electro-optical device according to the present invention, and polarizing plates individually disposed at the light-incident side and the light-emitting side of the liquid crystal panel.

The crossed dichroic prism 320 produces combined light for forming color images by combining three colored light (modulated light) modulated by the liquid crystal light valves 300R, 300G, and 300B, respectively. The crossed dichroic prism 320 includes four rectangular prisms (columnar prisms). The four rectangular prisms are provided with a red-light-reflecting film 321 and a blue-light-reflecting film 322 at a substantially X-shaped interface between the four rectangular prisms. The red-light-reflecting film 321 can include a dielectric multi-layered film which selectively reflects red light. The blue-light-reflecting film 322 can include a dielectric multi-layered film which selectively reflects blue light. The combined light for forming color images is produced with the three colored-light which are combined by the red-light-reflecting film 321 and the blue-light-reflecting film 322.

The projection optical system 340 projects the combined light emitted from the crossed dichroic prism 320 onto the screen SC, whereby color images are displayed on the screen SC.

The optical parts of the projector 1000 are mounted to a common base frame (hereinafter also referred to as a "general base frame"). According to the present embodiment, a plurality of optical parts included in the illumination optical system 100 are mounted to a base frame, which differs from the general base frame, and the base frame of the illumination optical system is mounted to the general base frame.

Figure 4:
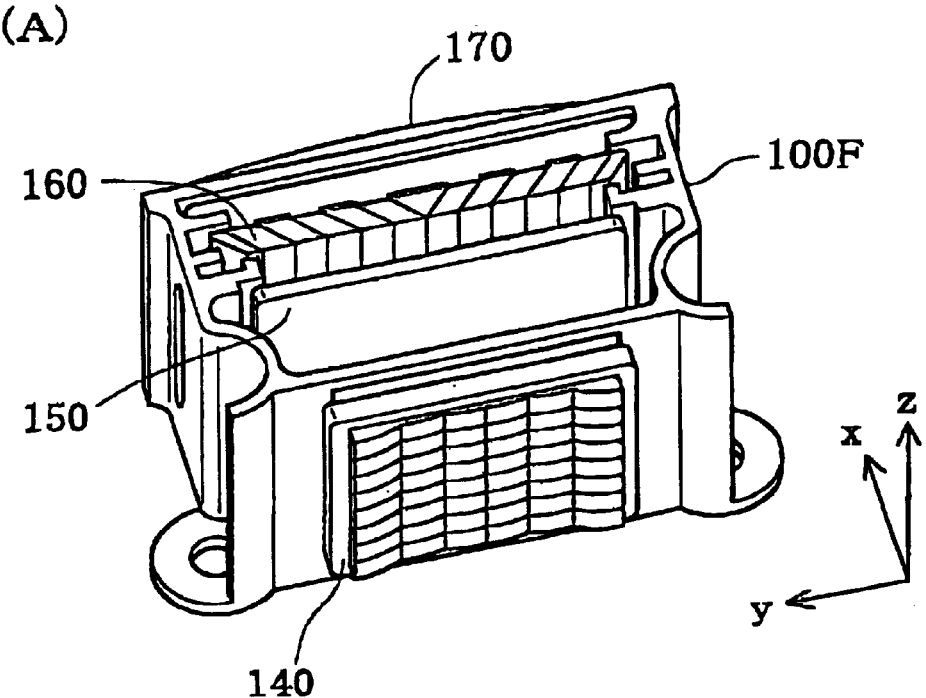
FIGS. 4 (A)–(B) illustrate a base frame 100F that mounts a plurality of optical parts included in the illumination optical system 100.
Figure 4:
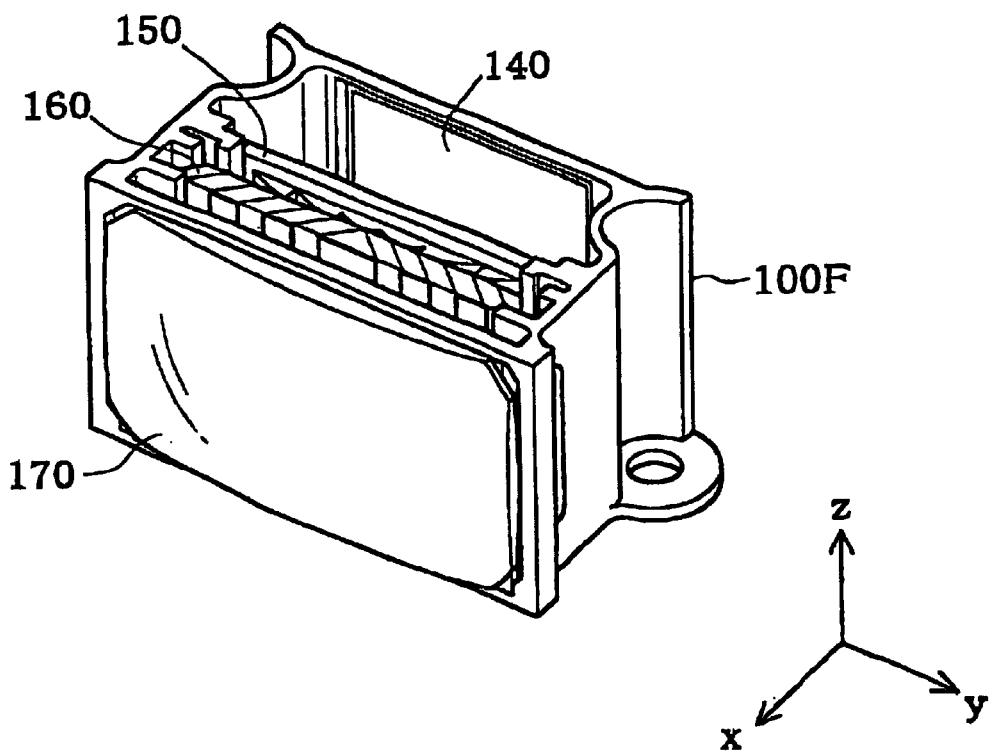

FIG. 4 illustrates a base frame 100F to which the plurality of optical parts included in the illumination optical system 100 are mounted. As in the drawings, the base frame 100F according to the present embodiment is provided with the first and second lens arrays 140 and 150, the polarizing optical system 160, and the superimposing lens 170. FIG. 4(A) is a perspective view of the base frame 100F seen from the first lens array 140. FIG. 4(B) is a perspective view of the base frame 100F seen from the superimposing lens 170.

As in FIGS. 4(A) and 4(B), the base frame 100F has a substantially rectangular parallelepiped shape, and is provided with an open face for receiving the optical parts inserted downward (in a Z-direction). Apertures are formed independently in the light-incident surface to which the first lens array 140 is mounted and in the light-emitting surface to which the superimposing lens 170 is mounted. The base frame 100F is provided with pairs of convexities and pairs of concavities, which position optical parts 140, 150, 160, and 170, extending from the upper face to the bottom face of the base frame 100F and toward the inside of the of the base frame 100F. The pairs of convexities are provided on, and the pairs of concavities are provided in sidewalls opposing each other of the base frame 100F so that the convexities or concavities oppose each other.

Figure 5:
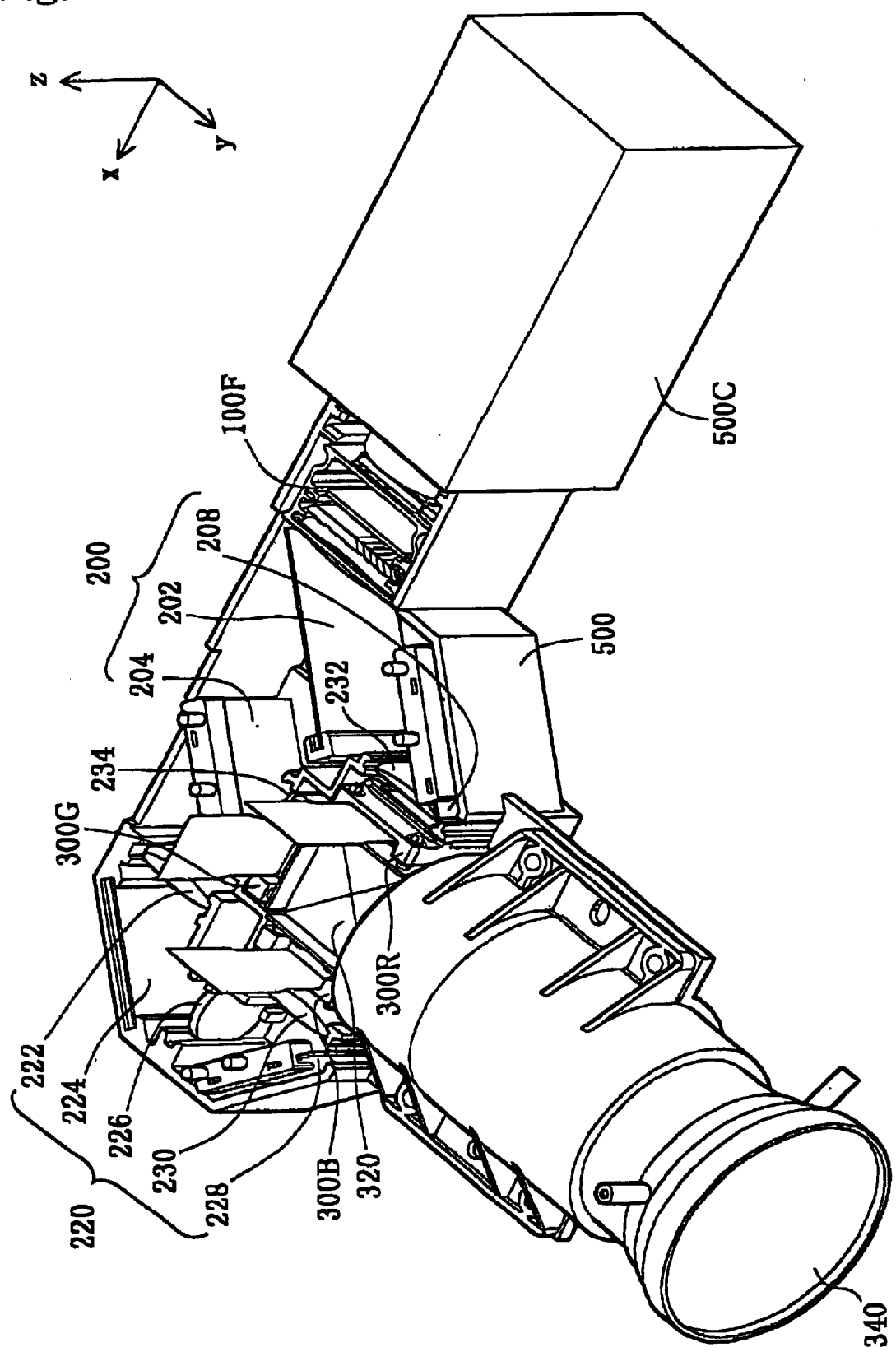
FIG. 5 is an illustration of a general base frame 500 that mounts optical parts of the projector.

FIG. 5 is a perspective view of a general base frame 500 having the optical parts of a projector mounted therein. As in the drawing, the general base frame 500 is mounted with various optical parts, such as the colored-light-separating optical system 200, the relay optical system 220, the liquid crystal light valves 300R, 300G, and 300B, the crossed dichroic prism 320, and the projection optical system 340. The general base frame 500 is provided with the base frame 100F shown in FIG. 4. The ultraviolet-removing filter 125 and the collimating lens 126 included in the light source unit 120 of the illumination optical system 100 (see FIG. 2) are mounted directly to the general base frame 500. The lamp 122 and the reflector 124 included in the light source unit 120 are mounted in a case 500C provided at an end part of the general base frame 500.

A base-frame cover which covers the general base frame 500 shown in FIG. 5 is mounted to the general base frame 500. The angles of the three mirrors 204, 208, and 228, which are disposed closest to the liquid crystal light valves 300R, 300G, and 300B, respectively, are controlled by a mirror-controlling mechanism which uses the base-frame cover.

Figure 6:
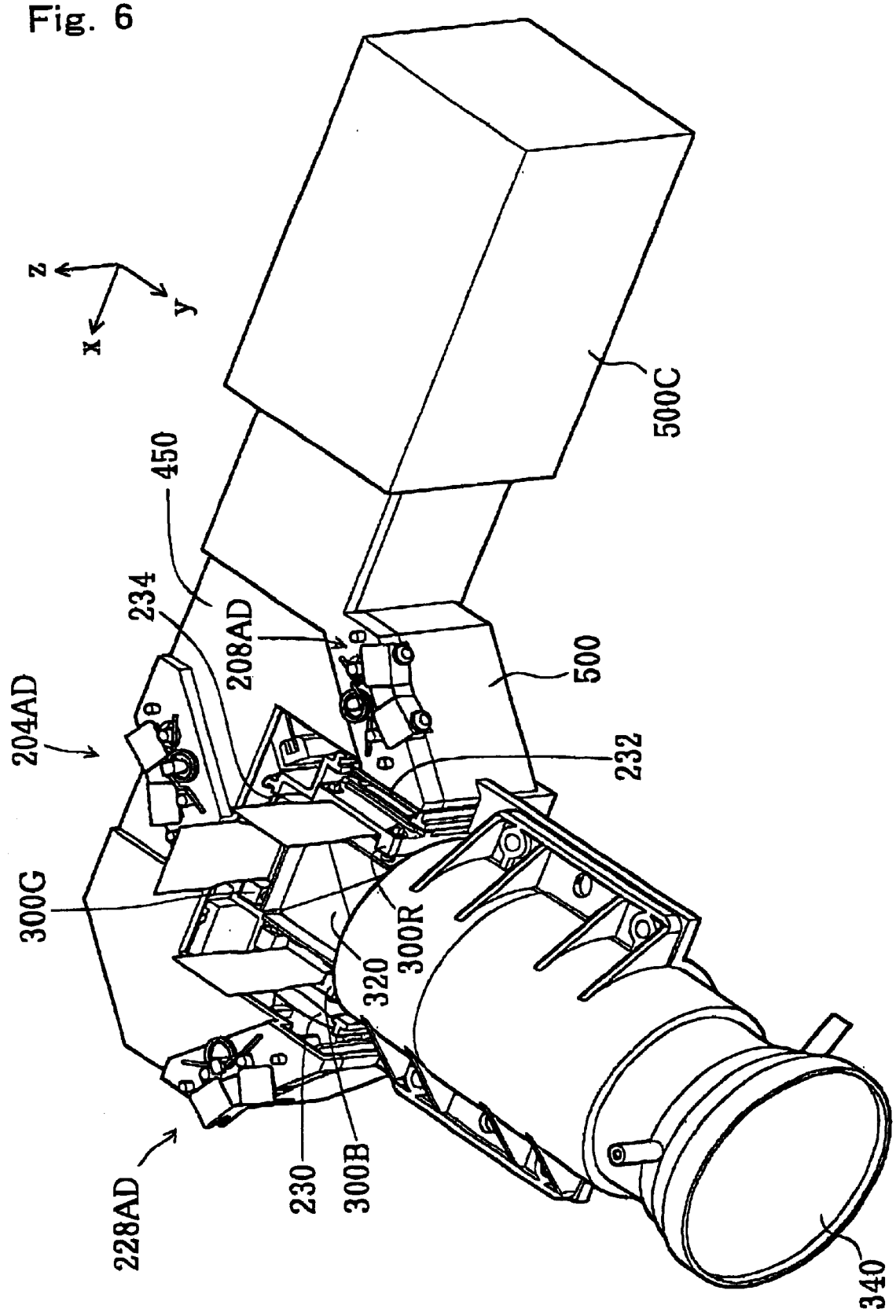
FIG. 6 is a perspective view of the general base frame 500 shown in FIG. 5 that mounts a base-frame cover 450.

FIG. 6 is a perspective view of the general base frame 500, shown in FIG. 5, covered with a base-frame cover 450. As in the drawing, the base-frame cover 450 can be formed so as to cover the illumination optical system 100, the colored-light-separating optical system 200, and the relay optical system 220. The three field lenses 230, 232, and 234, the three liquid crystal light valves 300R, 300G, and 300B, and the crossed dichroic prism 320 are not covered with the base-frame cover 450. Three mirror-controlling mechanisms 204AD, 208AD, and 228AD for controlling the angles of the three mirrors 204, 208, and 228, respectively, are mounted on an upper face of the base-frame cover 450.

Figure 7:
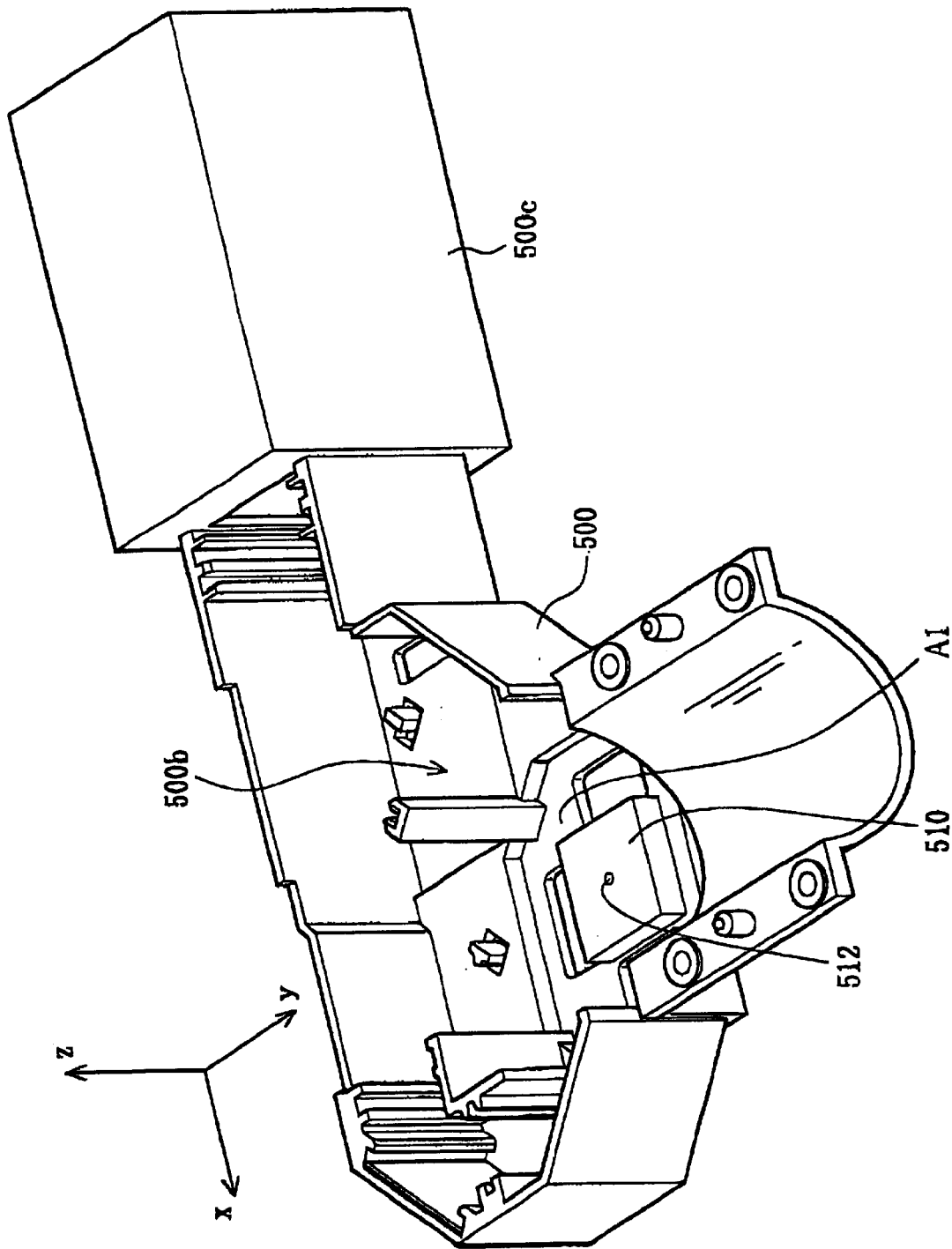
FIG. 7 is a perspective view of the general base frame 500 shown in FIG. 5.

FIG. 7 is a perspective view of the general base frame 500 shown in FIG. 5. As in the drawing, convexities for mounting the optical parts are formed on the inner walls of the general base frame 500. Columns having convexities and concavities for mounting the optical parts are disposed standing on a bottom face 500b of the general base frame 500.

The general base frame 500 is molded integrally with one sort of material (a metallic material or a heat-resistive resin). For example, a Mg alloy may be used as a metallic material, or an UP (unsaturated polyester resin) or a PPS (polyphenylene sulfide), which can be used in injection molding, may be used as a heat-resistive resin. By using one of these materials, heat resistance of the general base frame 500 can be improved, and the weight of the general base frame 500 can be relatively reduced. When using a metallic material, the thickness of the general base frame 500 can be relatively reduced, and heat dissipation from the same can be improved. According to the present embodiment, the base frame 100F (see FIG. 4) of the illumination optical system to be mounted to the general base frame 500 and the base-frame cover 450 (see FIG. 6) for covering the general base frame 500 are made in the same way as the general base frame.

As shown in FIG. 7, a mounting platform 510 for mounting the crossed dichroic prism 320 is formed on the bottom face 500b of the general base frame 500. The mounting platform 510 is provided with a small hole 512 at the center thereof. A region A1 relatively lower than the mounting platform 510 is formed around there.

The optical parts shown in FIGS. 1 and 5 can be mounted to the general base frame 500 in steps described below. First, the illumination optical system 100, the colored-light-separating optical system 200, and the relay optical system 220 are mounted to the general base frame 500. However, the field lens 230 included in the relay optical system 220 is separately mounted later, according to the present embodiment. Then, the base-frame cover 450 is mounted to the general base frame 500. The optical axes are controlled by using the mirror-controlling mechanisms 204AD, 208AD, and 228AD (see FIG. 6). In particular, the optical axes are controlled such that the central light beams of the respective three colored-light-fluxes emitted via the colored-light-separating optical system 200 and the relay optical system 220 pass above the small hole 512 formed in the center of the mounting platform 510.

When controlling the optical axes, the size (width) of each of the three colored-light-fluxes is preferably as small as possible so that the central light beams are easily specified. Therefore, a provisional light source which emits a collimated light flux may be used as a light source for control, instead of the lamp 122 and the reflector 124 mounted in the case 500c of the general base frame 500. As such a light source for control, a so-called white laser which can simultaneously emit, for example, R, G, and B laser beams may be used. Thus, the size of each of the three colored-light-fluxes emitted via the colored-light-separating optical system 200 and the relay optical system 220 can be relatively reduced, whereby the optical axes can be controlled relatively accurately.

Next, the projection optical system 340 is mounted to general the base frame 500. The crossed dichroic prism 320 is mounted onto the mounting platform 510, and the three liquid crystal light valves 300R, 300G, and 300B are bonded to the crossed dichroic prism 320. The three field lenses 230, 232, and 234 are mounted to the light-incident sides of the three liquid crystal light valves 300R, 300G, and 300B, respectively, whereby the assembly is completed.

Although in the above-described steps, the optical axes are controlled before the crossed dichroic prism 320 is mounted to the general base frame 500, it should also be understood that the optical axes may be controlled after the crossed dichroic prism 320 is mounted to the general base frame 500. In this case, the projection optical system 340 is mounted to the general base frame 500 after the optical axes are controlled.

In the above-described steps, the collimating lens 126 and the polarizing optical system 160 which form the illumination optical system 100, and the lenses 222 and 226 which form the relay optical system 220 are already mounted to the general base frame 500 when the optical axes are controlled. However, it should also be understood that the optical axes may be controlled when these are not mounted yet, whereby the optical axes can be controlled more accurately.

The method of mounting the crossed dichroic prism 320, the liquid crystal light valves 300R, 300G, and 300B, and the field lenses 230, 232, and 234 is further described below.

Figure 8:
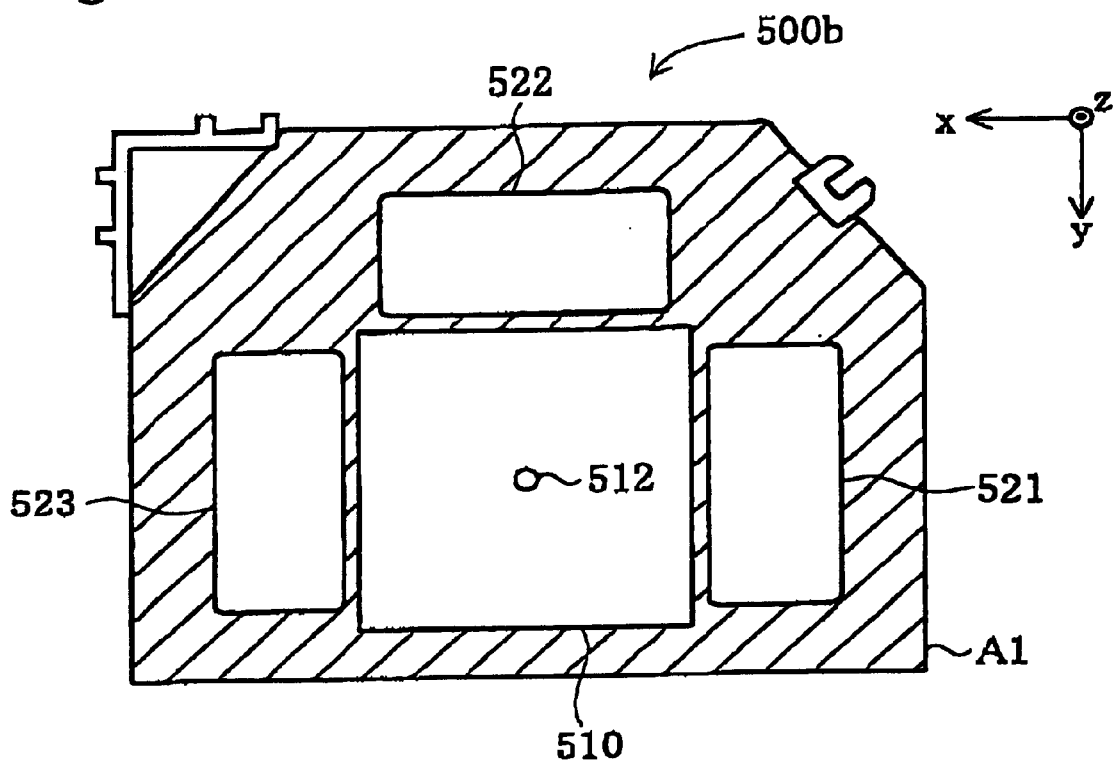
FIG. 8 is an expanded schematic plan view of a portion of the general base frame that mounts a mounting platform 510 shown in FIG. 7.

FIG. 8 is a schematic-expanded plan view of the mounting platform 510 shown in FIG. 7 and a region around the same. The region A1 relatively lower than the mounting platform 510 is hatched in the drawing. As in the drawing, the mounting platform 510 formed on the bottom face 500b is provided with a substantially square mounting face which is provided with the small hole 512 at the center thereof. Rectangular holes 521 to 523 are provided along respective three sides of the mounting platform 510.

Figure 9:
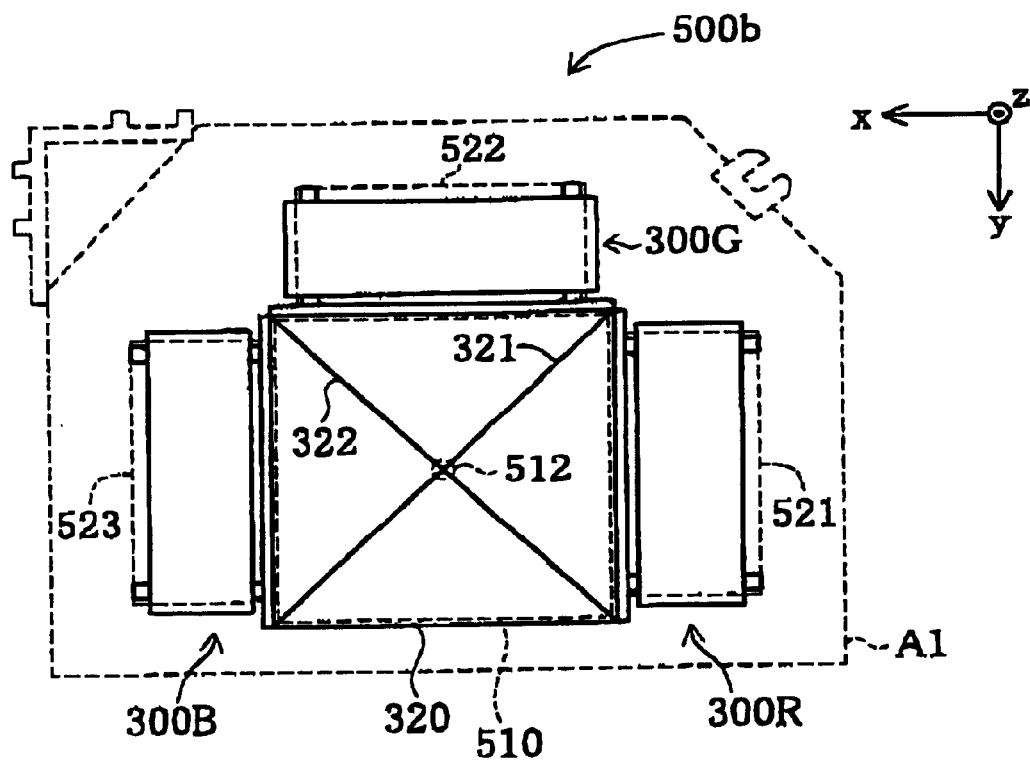
FIG. 9 is a schematic plan view of the mounting platform 510 shown in FIG. 8 that mounts a crossed dichroic prism 320.

FIG. 9 is a schematic plan view of the mounting platform 510 shown in FIG. 8 onto which the crossed dichroic prism 320 is mounted. In FIG. 9, the three liquid crystal light valves 300R, 300G, and 300B are bonded to the crossed dichroic prism 320. In the drawing, the liquid crystal light valves 300R, 300G, and 300B are significantly simplified.

In FIG. 9, the substantially square mounting face of the mounting platform 510 has an area which is substantially the same as that of the bottom face of the substantially cube crossed dichroic prism 320. In particular, the area of the mounting face is slightly smaller than that of the bottom face of the crossed dichroic prism 320. With this arrangement, interference between sidewalls of the mounting platform 510 and the liquid crystal light valves 300R, 300G, and 300B bonded to the crossed dichroic prism 320 can be avoided.

The crossed dichroic prism 320 is bonded directly to the mounting platform 510 of the general base frame 500. When bonding the crossed dichroic prism 320 onto the mounting platform 510, an adhesive is first applied onto the mounting platform 510. The crossed dichroic prism 320 is placed on the mounting platform 510 at a predetermined position thereof. In this case, the small hole 512 provided at the center of the mounting platform 510 is used. In particular, the crossed dichroic prism 320 is positioned such that the center of the bottom face thereof associates substantially with the center of the small hole 512, and the three colored light emitted from the colored-light-separating optical system 200 are combined accurately with each other by the crossed dichroic prism 320 and are emitted from the projection optical system 340. According to the present embodiment, the center of the bottom face of the crossed dichroic prism 320 (that is, the intersection of the red-light-reflecting film 321 and the blue-light-reflecting film 322 which are formed substantially in an X-shape) is positioned at the center of the small hole 512 by image processing. Thus, the small hole 512 serves to indicate the position of mounting the crossed dichroic prism 320.

The adhesive is preferably an ultraviolet-curing resin. By using an ultraviolet-curing resin, the crossed dichroic prism 320 can easily be bonded to the general base frame 500 relatively in a short time by applying an ultraviolet from above the crossed dichroic prism 320. An ultraviolet-curing resin, of which glass transition point is relatively low and flexibility is relatively high when cured, is preferably used.

When using such an ultraviolet-curing resin, the crossed dichroic prism 320 and the mounting platform 510 can be prevented from being removed from each other at the bonded part due to the difference of thermal expansion coefficient between the crossed dichroic prism 320 and the mounting platform 510.

After the crossed dichroic prism 320 is fixed by being bonded to the mounting platform 510 at a predetermined position, the liquid crystal light valves 300R, 300G, and 300B are bonded to the crossed dichroic prism 320.

Figure 10:
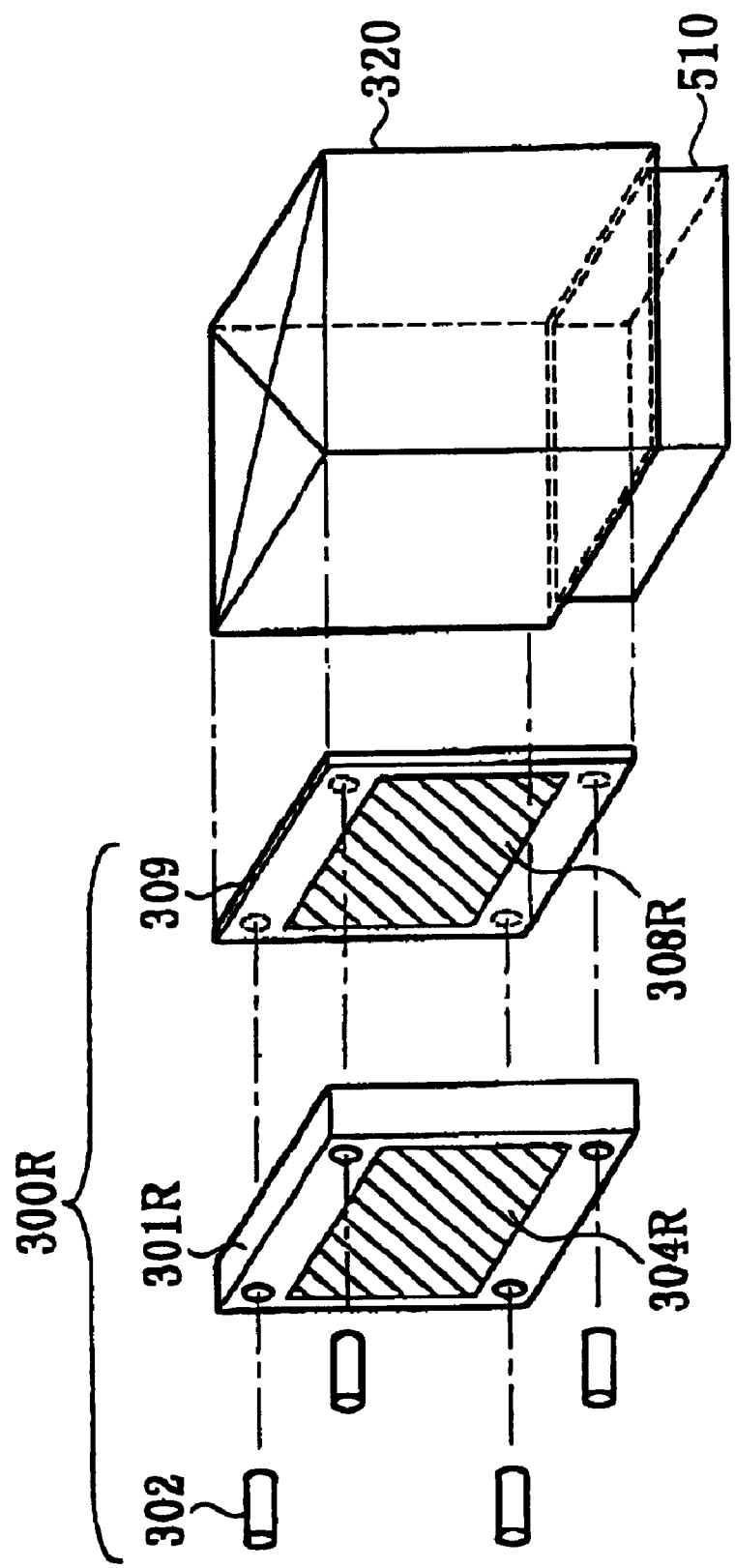
FIG. 10 is an illustration showing a step of bonding a first liquid crystal light valve 300R to the crossed dichroic prism 320.

FIG. 10 illustrates a step of bonding the first liquid crystal valve 300R to the crossed dichroic prism 320. The liquid crystal light valve 300R can include a panel-holding unit 301R, which includes a liquid crystal panel and a first polarizing plate 304R provided at the light-incident side of the liquid crystal panel, and a light transmissive substrate 309 with a second polarizing plate 308R bonded thereto. The liquid crystal light valves 300G and 300B have the same configuration.

First, the light transmissive substrate 309 is fixed by being bonded to the crossed dichroic prism 320. Then, the panel-holding unit 301R is fixed by being bonded to the light transmissive substrate 309. In particular, four substantially cylindrical fixing pins 302 including a light transmissive material are individually inserted into holes formed at four corners of the panel-holding unit 301R. The fixing pins 302 are coated with an ultraviolet-curing resin. The panel-holding unit 301R is positioned while being brought closer to the light transmissive substrate 309 by using a jig not shown in the drawing. In particular, the light-emitting face of the liquid crystal panel is disposed at an object point position (also referred to as a back-focus position) of the projection optical system 340 (see FIG. 1), and is positioned such that three color images to be projected coincide with each other at each pixel.

By applying an ultraviolet to the fixing pins 302 which are coated ultraviolet-curing resin from the left in the drawing, the light transmissive fixing pins 302 are bonded and fixed to the light transmissive substrate 309 and the panel-holding unit 301R. Thus, the three liquid crystal light valves 300R, 300G, and 300B are bonded to the crossed dichroic prism 320.

According to the present embodiment, the light transmissive substrate 309 forming the liquid crystal light valve 300R can include sapphire. The heat conductivity of sapphire is approximately 42 W/m•K, which is relatively high. Therefore, heat from the second polarizing plate 308R can easily be transmitted to the crossed dichroic prism 320 via the light transmissive substrate 309. As a result, temperature rise due to heat generation of the second polarizing plate 308R can be suppressed, and in-plane temperature distribution in the second polarizing plate 308R can become relatively even.

Although according to the present embodiment, the light transmissive substrate 309 includes sapphire, the light transmissive substrate 309 may include another material, such as, quartz (a monocrystal of $SiO_2$). The heat conductivity of quartz is approximately 5 to 10 W/m•K. When a material having heat conductivity of approximately 5 W/m•K or greater, the second polarizing plate 308R can be cooled efficiently.

When the crossed dichroic prism 320 is made of sapphire or quartz which has heat conductivity of approximately 5 W/m•K or greater, the light transmissive substrate 309 can be omitted, and the second polarizing plate 308R can be cooled more efficiently.

When the three liquid crystal light valves 300R, 300G, and 300B are bonded to the crossed dichroic prism 320, the liquid crystal light valves are disposed above the three rectangular holes 521 to 523 which are disposed in the general base frame 500, respectively, as shown in FIG. 9. Since the rectangular holes 521 to 523 are formed in positions of the bottom face 500b of the general base frame 500 associating with the liquid crystal light valves, cooling air from a cooling fan (not shown) is applied to the liquid crystal light valves through the rectangular holes, whereby temperature rise due to heat generation of the liquid crystal light valves can be suppressed. Since the crossed dichroic prism 320 is bonded directly to the general base frame 500, temperature rise of the crossed dichroic prism 320 due to the heat generation of the liquid crystal light valves can be suppressed when the general base frame 500 is molded integrally with a metallic material such as a Mg alloy. The suppression of the temperature rise in the crossed dichroic prism 320 can be made possible by forming at least a region to which the crossed dichroic prism is mounted, that is, the mounting platform 510 with a metallic material.

According to the present embodiment, when the crossed dichroic prism 320 is mounted to the mounting platform 510, the three field lenses 230, 232, and 234 (see FIG. 1) to be disposed in the vicinities of the light-incident sides of the three liquid crystal light valves 300R, 300G, and 300B, respectively, have not yet been mounted to the general base frame 500, so as to ensure a work space for bonding the liquid crystal light valves 300R, 300G, and 300B to the crossed dichroic prism 320, in particular, a space for inserting the above-described jig. According to the present embodiment, the three field lenses 230, 232, and 234 can easily be mounted to the general base frame 500 even after the liquid crystal light valves are bonded to the crossed dichroic prism 320 because the three field lenses 230, 232, and 234 are mounted, as a unit, onto a holding frame separately provided.

Figure 11:
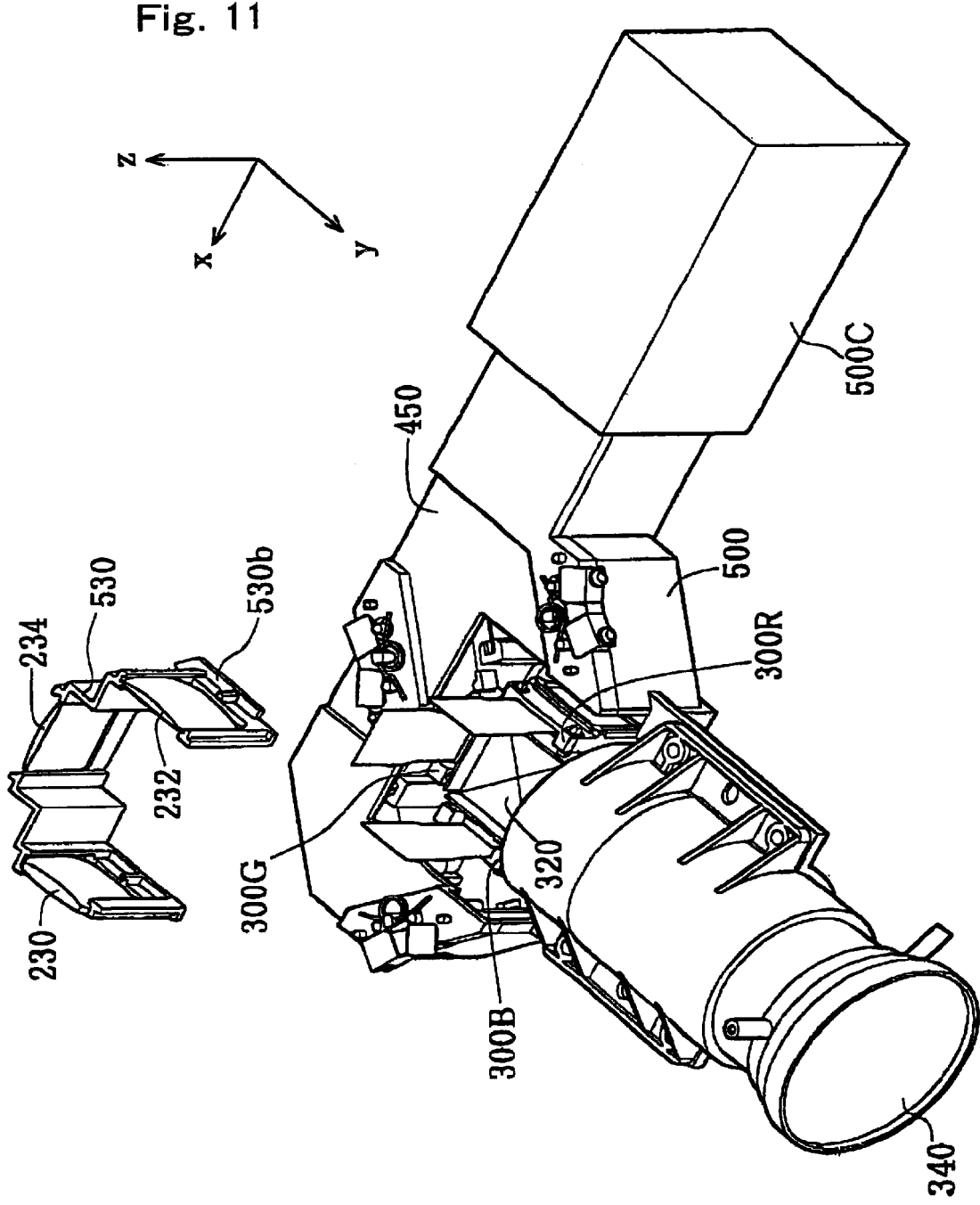
FIG. 11 is a perspective view showing a step of mounting three field lenses 230, 232, and 234 on the general base frame 500.

FIG. 11 is a perspective view in which the three field lenses 230, 232, and 234 are being mounted on the general base frame 500. The three field lenses 230, 232, and 234 can be mounted after all the other optical parts are mounted to the general base frame 500. The field lenses 230, 232, and 234 are mounted onto a holding frame 530 and are fixed thereto by being bonded, as shown in FIG. 11. A bottom face 530b of the holding frame 530 is formed so as to associate with the region A1 of the bottom face 500b relatively lower than the general base frame 500.

Figure 12:
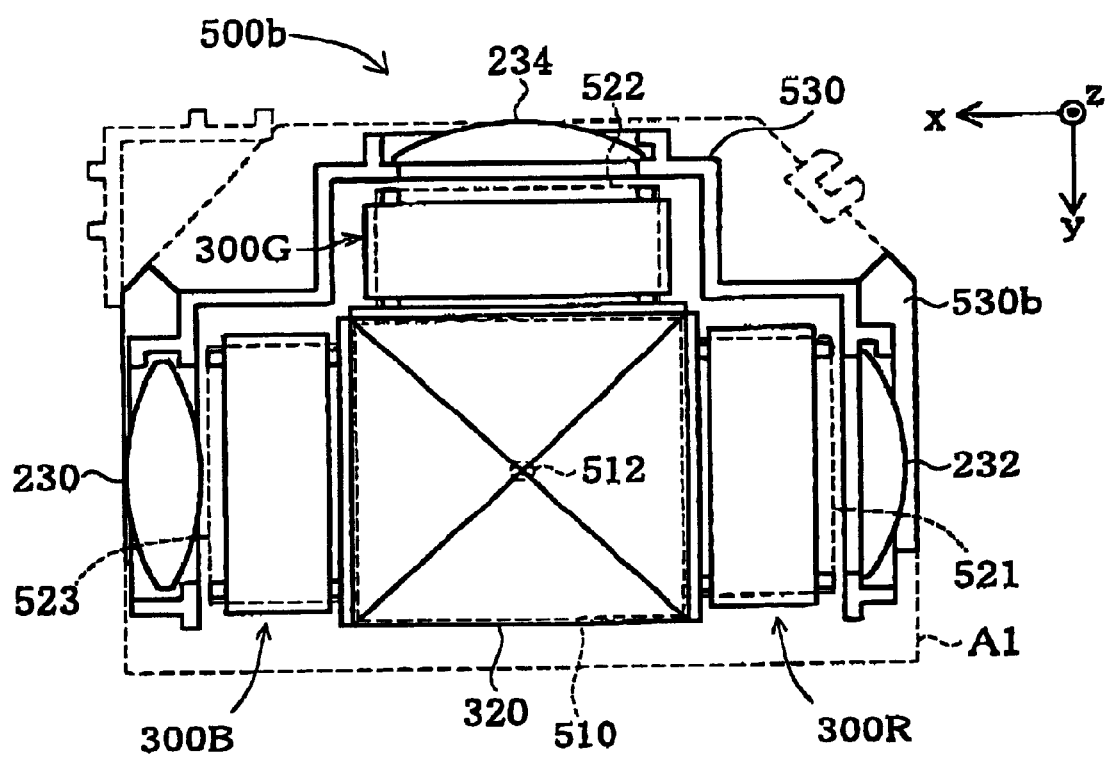
FIG. 12 is a schematic plan view showing disposition of the three field lenses 230, 232, and 234 mounted on the general base frame 500.

FIG. 12 is a schematic plan view of the three field lenses 230, 232, and 234 mounted onto the general base frame 500. As in the drawing, the holding frame 530 mounting the three field lenses is positioned by the bottom face 530b which associates with the shape of the region A1 formed lower than a region around the region A1. The field lenses 232, 234, and 230 are positioned in the vicinities of the light-incident sides of the liquid crystal light valves 300R, 300G, and 300B, respectively. The holding frame 530 is fixed by being bonded to the bottom face 500b of the general base frame 500 after being positioned.

According to the present embodiment, as described above, a projector is provided with the general base frame 500 for mounting a plurality of optical parts to be disposed in an optical path from the illumination optical system 100 to the projection optical system 340. The crossed dichroic prism 320 having the selective films 321 and 322 formed substantially in an X-shape is positioned with respect to the general base frame 500 and is directly bonded thereto, the selective films 321 and 322 selecting light which has a predetermined range of wavelengths. With this arrangement, the crossed dichroic prism can be mounted accurately in a predetermined position of the general base frame compared with a case in which the crossed dichroic prism is fixed by using, for example, screws.

When the crossed dichroic prism 320 and the liquid crystal light valves can be mounted accurately in a predetermined position, respective illumination regions formed with light incident to the liquid crystal light valves, that is, respective illumination margins of the liquid crystal light valves can relatively be reduced, whereby brightness of images can be improved.

Figure 13:
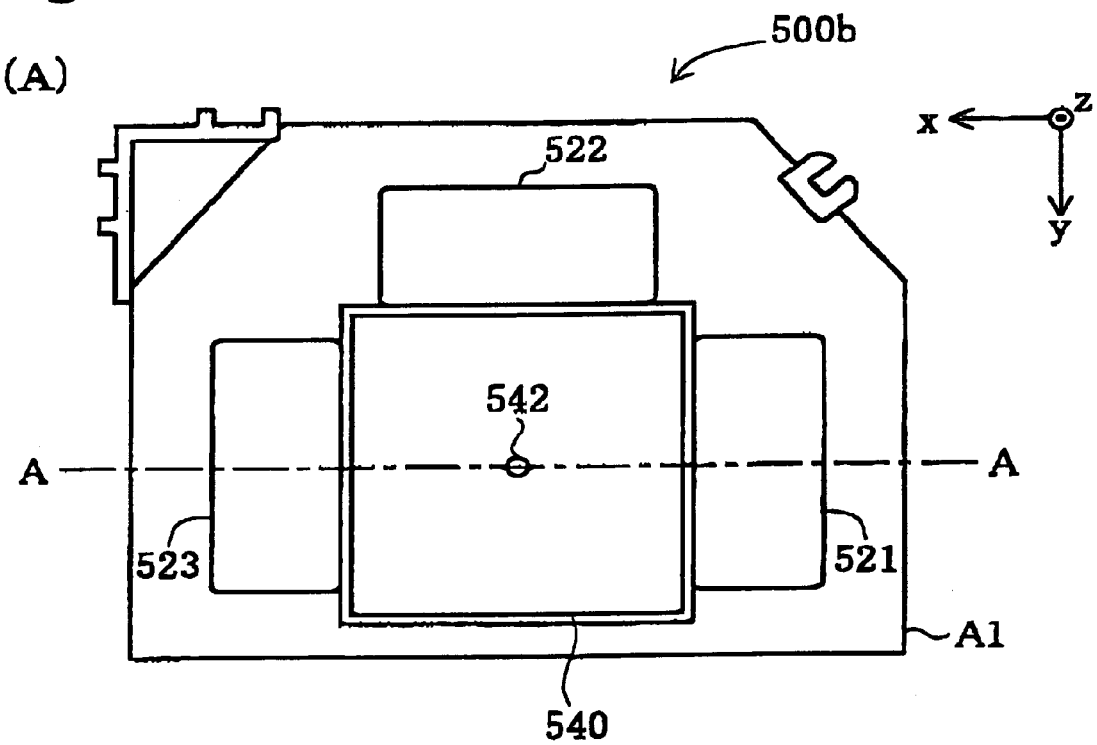
FIGS. 13 (A)–(B) are expanded schematic plan views of a region in which a crossed dichroic prism 320 is mounted, according to a second embodiment.
Figure 13:
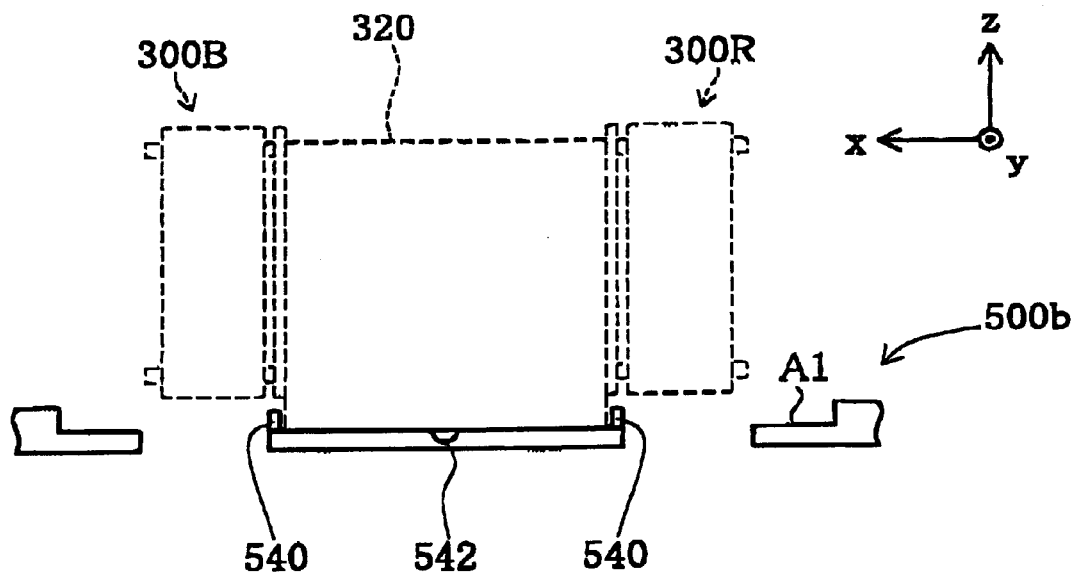

FIG. 13 includes schematic expanded views of a region for mounting a crossed dichroic prism 320, according to a second embodiment. FIG. 13(A) is a schematic plan view of a region A1 relatively lower than a region around the region A1 of a bottom face 500b of a general base frame 500. The region A1 has almost the same configuration as that shown in FIG. 8. However, according to the present embodiment, a convexity 540 is provided around the region for mounting a crossed dichroic prism, instead of the mounting platform 510 shown in FIG. 8 for mounting the crossed dichroic prism 320. The convexity 540 is provided with a circular concavity 542 at the center of the convexity 540, instead of the small hole 512 shown in FIG. 8.

FIG. 13(B) is a schematic sectional view along line A—A of the region A1 shown in FIG. 13(A).

In FIG. 13(B), liquid crystal light valves 300R, 300G, and 300B and the crossed dichroic prism 320 mounted on the general base frame 500 are shown by dotted lines. According to the present embodiment, the crossed dichroic prism 320 is also bonded directly to the general base frame 500. In particular, an adhesive is applied to an inner part of the convexity 540 provided on the bottom face 500b, and the crossed dichroic prism 320 is disposed in a predetermined position of the inner part of the convexity 540. In this case as well as in the first embodiment, the concavity 542 formed in the center of the convexity 540 is used for positioning the crossed dichroic prism 320. The convexity 540 prevents surplus of the adhesive applied to the inner part of the convexity 540 from spilling and spreading to a surrounding region.

By using the general base frame shown in FIGS. 13(A) and 13(B), a crossed dichroic prism can be mounted accurately in a predetermined position of the general base frame in the same manner as in the first embodiment.

Although in the first and second embodiments, the crossed dichroic prism 320 including four rectangular prisms having the red-light-reflecting film 321 and the blue-light-reflecting film 322 at the substantially X-shaped interface between the four rectangular prisms is used as a colored-light-combining optical system, another type of colored-light-combining prism may be used as the colored-light-combining optical system.

Figure 14:
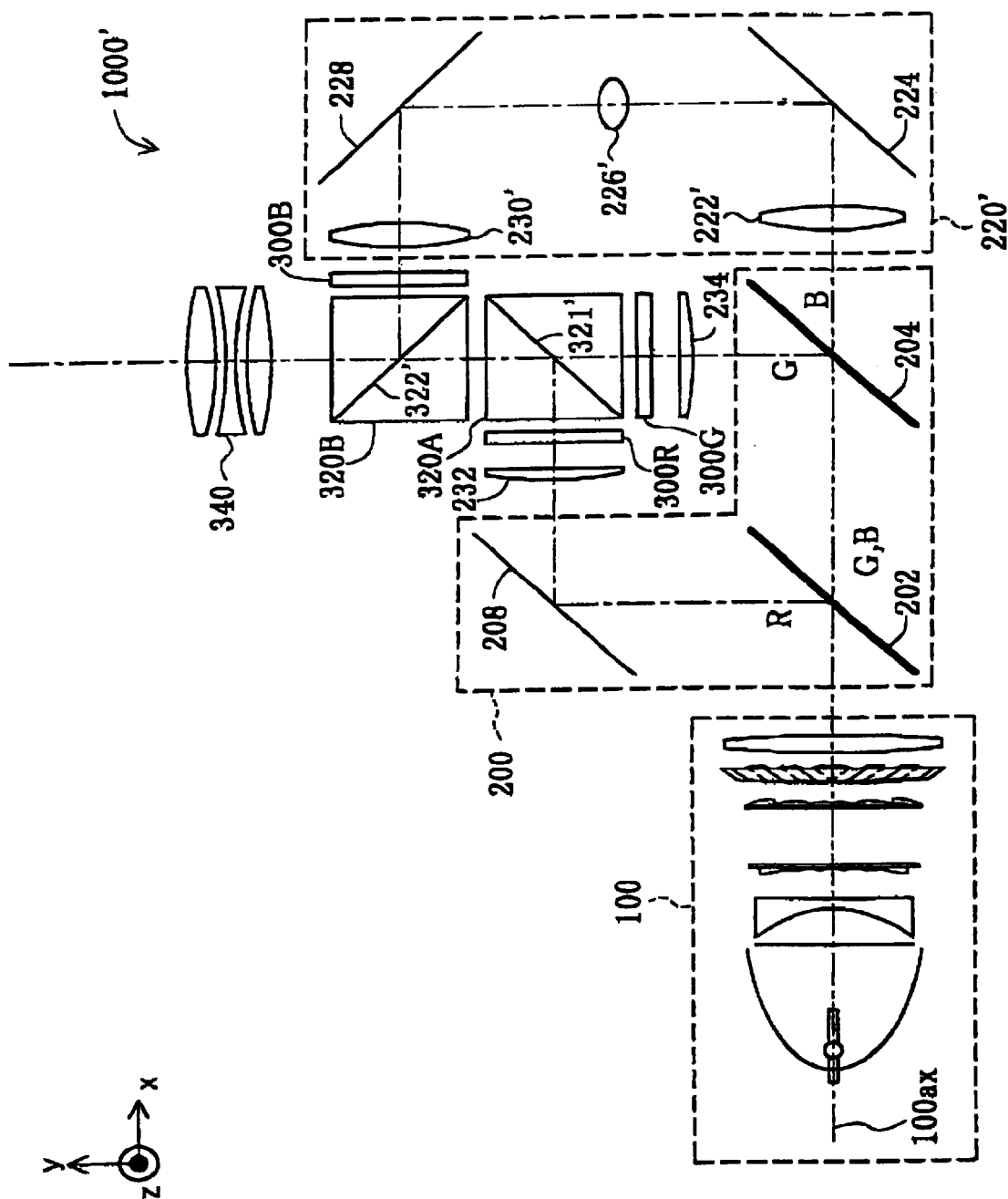
FIG. 14 is a schematic diagram of a projector 1000' according to a third embodiment.

FIG. 14 is a schematic diagram of a projector 1000' according to a third embodiment. The projector 1000' uses two colored-light-combining prisms 320A and 320B as the colored-light-combining optical system. In accordance with the modification of the colored-light-combining optical system, a relay optical system 220' is modified. In particular, an incident-side lens 222', a relay lens 226', and a field lens 230' of the relay optical system 220' are modified.

The colored-light-combining prisms 320A and 320B are respectively provided with two rectangular prisms (columnar prisms). The first colored-light-combining prism 320A is provided with a red-light-reflecting film 321' for selectively reflecting red light, formed at the interface between the two rectangular prisms of the first colored-light-combining prism 320A. The second colored-light-combining prism 320B is provided with a blue-light-reflecting film 322' for selectively reflecting blue light, formed at the interface between the two rectangular prisms of the second colored-light-combining prism 320B.

According to the present embodiment, the two colored-light-combining prisms 320A and 320B are bonded directly to a general base frame 500 in the same manner as in the first and second embodiments. Therefore, the two colored-light-combining prisms can be mounted accurately in predetermined positions of the general base frame.

According to the first embodiment, the crossed dichroic prism 320 is bonded to the mounting platform 510 of the general base frame 500. The mounting platform may be formed detachable.

Figure 15:
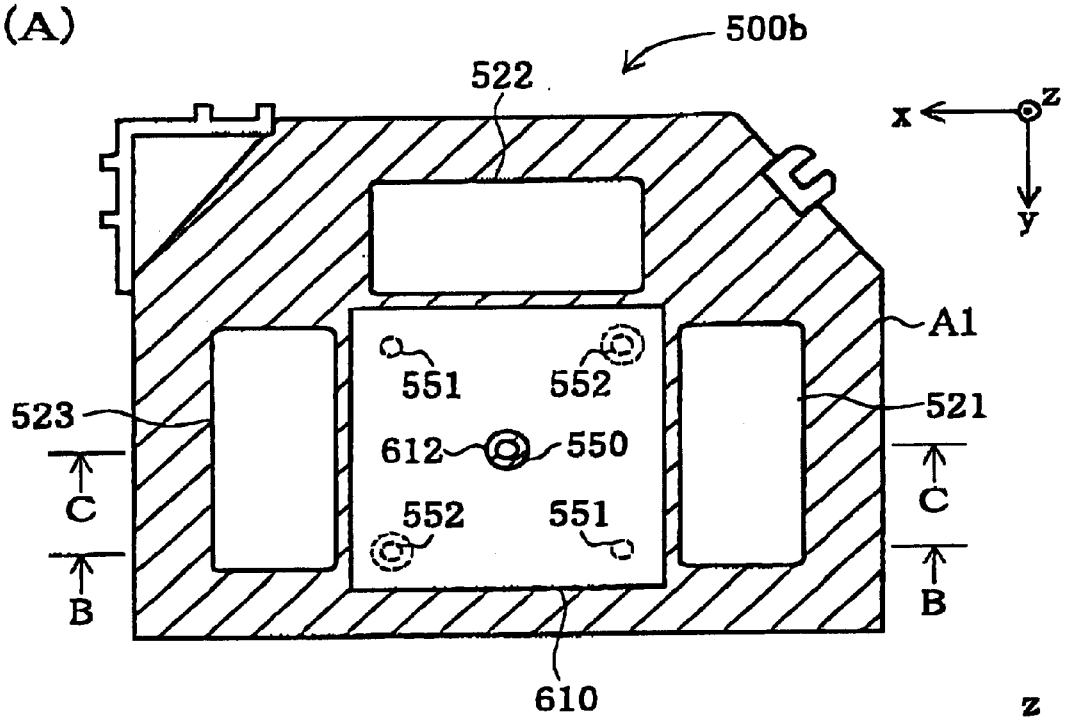
FIGS. 15 (A)–(B)–(C) are expanded schematic plan views of a region in which a crossed dichroic prism 320 is mounted, according to a fourth embodiment.
Figure 15:
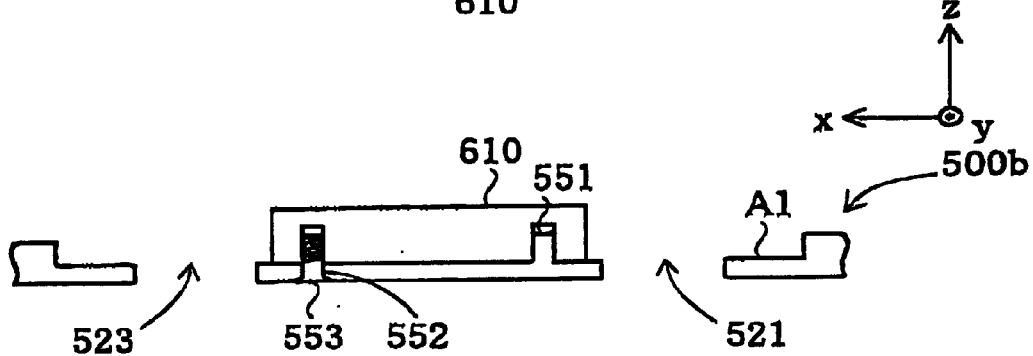
Figure 15:
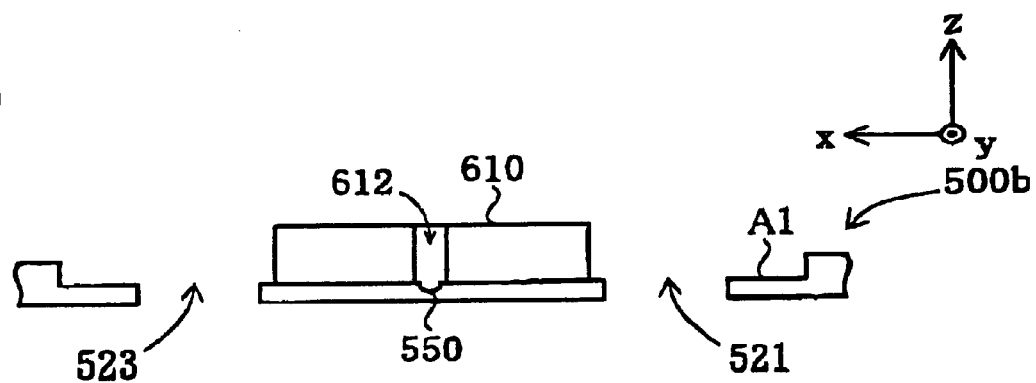

FIG. 15 shows schematic expanded views of a region in which a crossed dichroic prism 320 is mounted, according to a fourth embodiment. FIG. 15(A) is a schematic plan view of a region A1 relatively lower than a region around the region A1 of a bottom face 500b of a general base frame 500. The region A1 has substantially the same configuration as that shown in FIG. 8. However, according to the present embodiment, a detachable mounting platform 610 is mounted to the general base frame 500. FIGS. 15(B) and 15(C) are schematic sectional views along lines B—B and C—C, respectively, of the region A1 shown in FIG. 15(A).

As in the drawings, a circular concavity 550 is formed in the center of a region, to which the mounting platform 610 is fixed, of the bottom face 500b of the general base frame 500. The bottom face 500b is provided with two positioning pins 551 and two mounting holes 552 so as to sandwich the concavity 550.

The mounting platform 610 is provided with a hole 612 formed in a center thereof, the hole 612 having a diameter slightly larger than that of the concavity 550. The mounting platform 610 is provided in a bottom face thereof with two mating holes and two female screws for associating with the two positioning pins 551 and the two mounting holes 552, respectively, formed in the bottom face 500b of the general base frame 500.

When the mounting platform 610 is positioned by the two positioning pins 551 provided at the bottom face 500b, the mounting platform 610 is fixed to the general base frame 500 by two screws 553. In this case, the circular concavity 550 provided in the bottom face 500b is visible through the hole 612 formed in the center of the mounting platform 610. The concavity 550 is used for positioning the crossed dichroic prism 320 in the same manner as in the first embodiment.

When the mounting platform 610 is detachably fixed by using the screws 553, it is difficult to mount the mounting platform 610 accurately in a predetermined position of the general base frame 500. However, the crossed dichroic prism 320 is bonded to the mounting platform 610 by using the concavity 550 formed in the general base frame 500 as a reference after the detachable mounting platform 610 is fixed to the general base frame 500, according to the present embodiment. Therefore, the crossed dichroic prism 320 can be mounted accurately in a predetermined position of the general base frame 500.

When a detachable mounting platform is used, as in the present embodiment, the general base frame 500 is preferably provided with a mark, such as the concavity 550 for indicating a position of mounting a prism. The mounting platform is preferably provided with a hole for confirming the mark of the general base frame 500 from above the mounting platform. When the mounting platform comprises a light transmissive material such as glass, such a hole may be omitted.

When the mounting platform 610 is detachable, liquid crystal light valves can easily be removed from the general base frame 500 by removing the mounting platform 610 from the general base frame 500 when the liquid crystal light valves are damaged. When replacing, the crossed dichroic prism and the liquid crystal light valves may be mounted as described above after another mounting platform for replacement is fixed to the general base frame 500.

Figure 16:
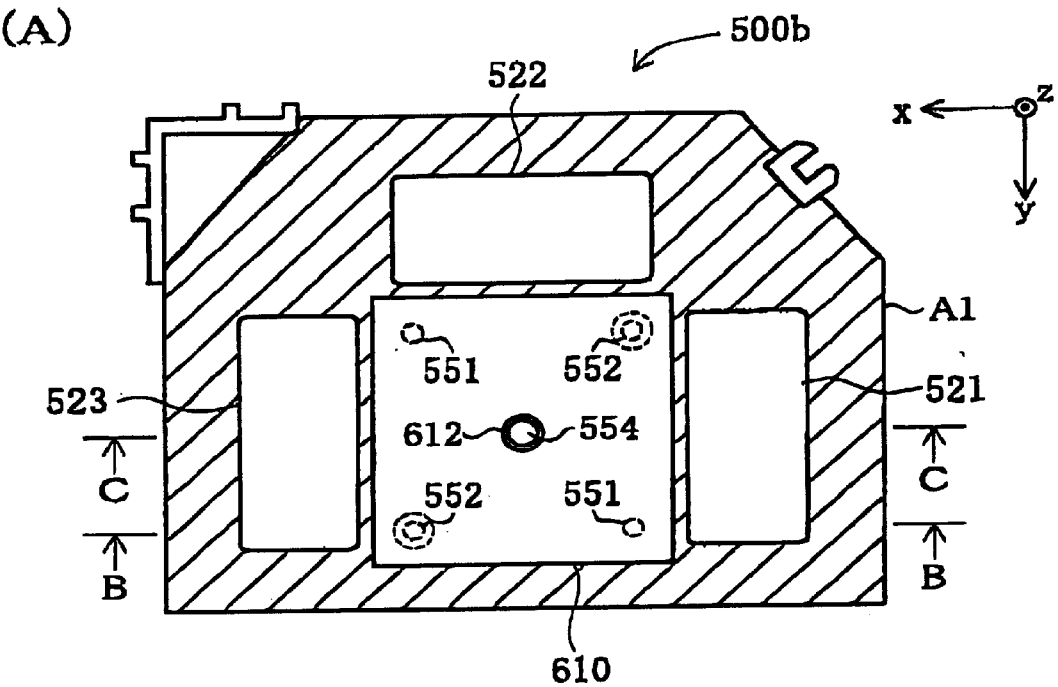
FIGS. 16 (A)–(B)–(C) illustrate a modified example of a general base frame 500 shown in FIG. 15.
Figure 16:
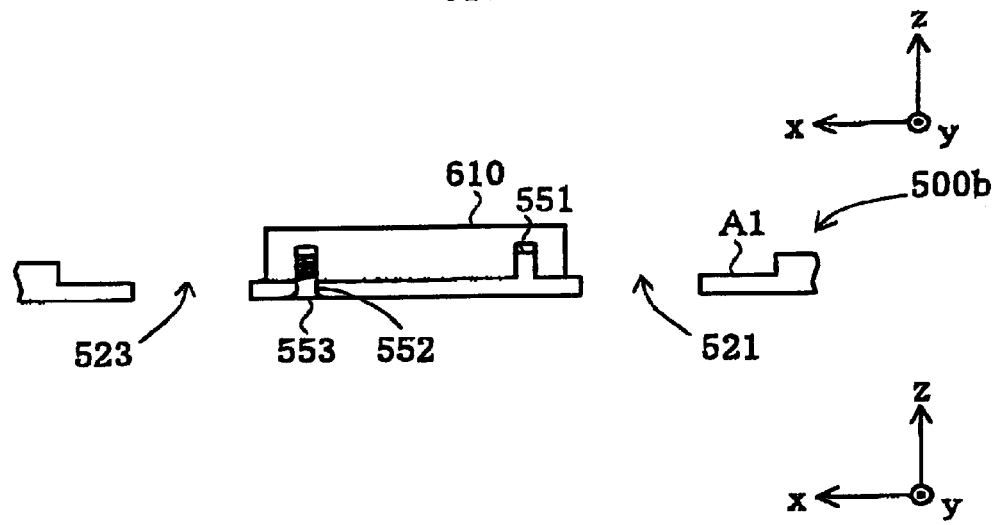
Figure 16:
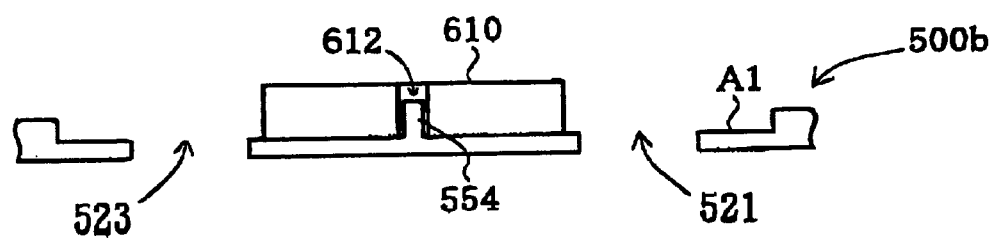

FIG. 16 includes illustrations of a modified example of the general base frame 500 shown in FIG. 15. The general base frame 500 shown in FIG. 16 is substantially the same as that shown in FIG. 15, but they differ from each other in that the general base frame 500 shown in FIG. 16 is provided with a standing cylinder 554 instead of the concavity 550 provided in the general base frame 500 shown in FIG. 15.

When using the general base frame 500 described above, the crossed dichroic prism 320 can be mounted accurately in a predetermined position of the general base frame 500 because the crossed dichroic prism 320 can be bonded onto the mounting platform 610 by using the cylinder 554 formed on the general base frame 500 as a reference after the detachable mounting platform 610 is fixed to the general base frame 500.

It should be understood that the present invention is not limited to the above-described embodiments and modified examples, and various applications are possible without departing from the spirit and scope of the present invention. For example, the following modifications are possible.

(1) According to the first to third embodiments, the crossed dichroic prism 320 is positioned by using the small hole 512 provided at the center of the mounting platform 510 shown in FIG. 8 or the concavity 542 provided in the center of the convexity 540 shown in FIG. 13. However, another mark may be used for indicating position of mounting the crossed dichroic prism 320 to the general base frame 500. For example, a substantially X-shaped cut-away part may be provided in the mounting platform 510 or in an inner region of the convexity 540. The mounting platform 510 and the convexity 540 themselves have a function to indicate the approximate position of mounting the crossed dichroic prism 320.

In general, the mark for indicating position of mounting a substantially cube colored-light-combining prism may be formed on the general base frame in the vicinity of a substantially square region thereof to which the colored-light-combining prism is bonded.

(2) Although in the above embodiments, the colored-light-separating optical system 200 includes two dichroic mirrors 202 and 204, one colored-light-combining prism (crossed dichroic prism) 320 shown in FIG. 1 or two colored-light-combining prisms 320A and 320B shown in FIG. 14 may be used instead of the two dichroic mirrors 202 and 204. That is, the colored-light-combining optical system shown in FIGS. 1 and 14 functions as a colored-light-separating optical system when light is incident in an inverse direction. When the colored-light-combining prism is used as a colored-light-separating prism, the colored-light-separating prism may be bonded to the general base frame 500.

In general, when at least one of the colored-light-separating optical system and the colored-light-combining optical system includes a prism provided with a selective film for selecting light which has a predetermined range of wavelengths, the prism may be bonded directly to the general base frame.

When at least one of the colored-light-separating optical system and the colored-light-combining optical system includes a prism provided with a selective film for selecting light which has a predetermined range of wavelengths, the prism may be bonded to a detachable mounting platform which is fixed to a general base frame.

(3) Although in the above embodiments, the three liquid crystal light valves 300R, 300G, and 300B are bonded onto the crossed dichroic prism 320 after the crossed dichroic prism 320 is mounted onto the general base frame 500, the three liquid crystal light valves 300R, 300G, and 300B and the crossed dichroic prism 320 may be assembled with each other as a unit in advance. Thus, the liquid crystal light valves can easily be bonded to the crossed dichroic prism. However, with the arrangement according to the above-described embodiments, the liquid crystal light valves can be positioned according to each projector.

(4) Although in the above embodiments, transmission-type liquid crystal panels are used as electro-optical devices, reflection-type liquid crystal panels may be used. In this case, it should be understood that the same operations and advantages can be provided as in the case in which transmission-type liquid crystal panels are used.

(5) Although in the above embodiments, the projector 1000 is provided with the liquid crystal panels as electro-optical devices, the projector 1000 may be instead provided with a micromirror-type optical modulator. For example, a DMD (digital micromirror device) (a trademark of Texas Instruments) may be used as the micromirror-type optical modulator. In general, an optical modulator for modulating incident light according to image data may be used as the electro-optical device.

What is claimed is:

1. A projector for displaying color images, comprising:
    an illumination optical system;
    a colored-light-separating optical system that separates light emitted from the illumination optical system into first, second, and third colored light corresponding to three color components, respectively;
    first, second, and third electro-optical devices which modulate the first, second, and third colored light, respectively, according to image data, and produce first, second, and third modulated light, respectively;
    a colored-light-combining optical system that combines the first, second, and third modulated light;
    a projection optical system that projects the combined light emitted from the colored-light-combining optical system; and a base frame that mounts a plurality of optical parts which are disposed in a light path extending from the illumination optical system to the projection optical system, at least one of the colored-light-separating optical system and the colored-light-combining optical system being provided with a prism which includes a selection film formed therein that selects light having a predetermined range of wavelengths, and the prism being bonded directly to the base frame.

2. The projector according to claim 1, the prism being a colored-light-combining prism which forms the colored-light-combining optical system.

3. The projector according to claim 2, the colored-light-combining prism comprising four columnar prisms sectioned by a substantially X-shaped interface, and two types of selection films formed at the substantially X-shaped interface.

4. The projector according to claim 3, the colored-light-combining prism being bonded to the base frame with an ultraviolet-curing resin.

5. The projector according to claim 3, a mark being provided in the vicinity of a substantially square region of the base frame to which the colored-light-combining prism having a substantially cubic shape is bonded, the mark indicating a position for mounting the colored-light-combining prism.

6. The projector according to claim 5, the mark being a hole provided in the center of the substantially square region to which the colored-light-combining prism is bonded.

7. The projector according to claim 5, the mark being a concavity provided in the center of the substantially square region to which the colored-light-combining prism is bonded.

8. The projector according to claim 3, the base frame comprising a metal material at least in the region thereof to which the colored-light-combining prism is bonded.

9. The projector according to claim 3, the first, second, and third electro-optical devices being three liquid crystal panels, and three liquid crystal light valves including the three liquid crystal panels, respectively, being bonded to the colored-light-combining prism.

10. The projector according to claim 9, the liquid crystal light valves being respectively provided with a polarizing plate disposed at a light-emitting face of the liquid crystal panel and a light transmissive substrate with the polarizing plate bonded thereto and having a heat conductivity of not less than approximately 5 W/m•K, and each light transmissive substrate being bonded to the colored-light-combining prism.

11. The projector according to claim 10, the light transmissive substrate comprising at least one of quartz and sapphire.

12. The projector according to claim 9, the liquid crystal light valves being respectively provided with a polarizing plate disposed at a light-emitting face of the liquid crystal panel and bonded to the colored-light-combining prism, and the four columnar prisms of the colored-light-combining prism comprising a light transmissive material having a heat conductivity of not less than approximately 5 W/m•K.

13. The projector according to claim 12, the light transmissive material being at least one of quartz and sapphire.

14. The projector according to claim 9, further comprising:

three lenses disposed in the vicinities of light-incident faces of the three liquid crystal light valves, respectively, the three lenses being mounted to a holding frame, separate from the base frame, and being fixed to the base frame.

15. A projector for displaying color images, comprising:

an illumination optical system;

a colored-light-separating optical system that separates light emitted from the illumination optical system into first, second, and third colored light corresponding to three color components, respectively;

first, second, and third electro-optical devices which modulate the first, second, and third colored light, respectively, according to image data, and produce first, second, and third modulated light, respectively;

a colored-light-combining optical system that combines the first, second, and third modulated light;

a projection optical system that projects the combined light emitted from the colored-light-combining optical system; and a base frame that mounts a plurality of optical parts which are disposed in a light path extending from the illumination optical system to the projection optical system, 'at least one of the colored-light-separating optical system and the colored-light-combining optical system being provided with a prism which includes a selection film formed therein that selects light having a predetermined range of wavelengths, a detachable mounting platform that mounts the prism being fixed to the base frame, and the prism being bonded to the mounting platform fixed to the base frame.

16. The projector according to claim 15, a mark being provided in the vicinity of a substantially square region of the base frame to which the colored-light-combining prism having a substantially cubic shape is bonded, the mark indicating a position of mounting the colored-light-combining prism; and the mounting platform being provided with a hole formed therein through which the mark formed on the base frame can be confirmed from the upper side of the mounting platform.

17. A method for fixing a prism, having a selection film formed therein for selecting light having a predetermined range of wavelengths, and that is included in at least one of a colored-light-separating optical system and a colored-light-combining optical system, to a base frame of a projector for displaying color images, the projector having an illumination optical system, the colored-light separating-optical system for separating light emitted from the illumination optical system into first, second, and third colored light corresponding to three color components, respectively, first, second, and third electro-optical devices which modulate the first, second, and third colored light, respectively, according to image data, and produce first, second, and third modulated light, respectively, the colored-light-combining optical system for combining the first, second, and third modulated light, a projection optical system for projecting the combined light emitted from the colored-light-combining optical system, and the base frame for mounting a plurality of optical parts which are disposed in a light path extending from the illumination optical system to the projection optical system, the method comprising the steps of:

fixing a detachable mounting platform that mounts the prism to the base frame; and bonding the prism to the mounting platform fixed to the base frame.

\* \* \* \* \*